US012666235B2

(12) United States Patent
Kozlova et al.

(10) Patent No.: US 12,666,235 B2
(45) Date of Patent: Jun. 23, 2026

(54) 5G SLICE SUBNET TEMPLATES FOR NETWORK SLICE PROVISIONING

(71) Applicant: Juniper Networks, Inc., Sunnyvale, CA (US)

(72) Inventors: Yelena Kozlova, Sunnyvale, CA (US); Lyubov Nesteroff, Pleasant Hill, CA (US); Ojas Gupta, Mountain View, CA (US); Marc-Andre Bordeleau, Shawinigan (CA); Constantine Dimitrios Polychronopoulos, Saratoga, CA (US); Arda Akman, San Ramon, CA (US); Jeremy Alan Tidemann, Savoy, IL (US); Georgios Oikonomou, Patra (GR); Robert Edward Kidd, Champaign, IL (US); Edward Wai Hong Choh, Richmond (CA)

(73) Assignee: Hewlett Packard Enterprise Development LP, Spring, TX (US)

( * ) Notice: Subject to any disclaimer, the term of this patent is extended or adjusted under 35 U.S.C. 154(b) by 820 days.

(21) Appl. No.: 17/933,421

(22) Filed: Sep. 19, 2022

(65) Prior Publication Data

US 2023/0276211 A1    Aug. 31, 2023

(30) Foreign Application Priority Data

Feb. 28, 2022    (GR) ................................ 0220100182

(51) Int. Cl.
*H04W 48/18* (2009.01)
*H04W 4/50* (2018.01)

(52) U.S. Cl.
CPC ............. *H04W 4/50* (2018.02); *H04W 48/18* (2013.01)

(58) Field of Classification Search
CPC ........ H04W 4/50; H04W 48/18; H04W 24/02
See application file for complete search history.

(56) References Cited

U.S. PATENT DOCUMENTS

| | | | |
|---|---|---|---|
| 6,219,053 | B1 | 4/2001 | Tachibana et al. |
| 7,146,568 | B2 | 12/2006 | Richardson |

(Continued)

FOREIGN PATENT DOCUMENTS

| | | |
|---|---|---|
| CN | 109218047 A | 1/2019 |
| CN | 112910677 A | 6/2021 |

(Continued)

OTHER PUBLICATIONS

"3rd Generation Partnership Project; Technical Specification Group Services and System Aspects; System architecture for the 5G System (5GS); Stage 2 (Release 17)" 3GPP, Mar. 2021, 489 pp.

(Continued)

*Primary Examiner* — Julio R Perez

(74) *Attorney, Agent, or Firm* — Shumaker & Sieffert P.A.

(57) ABSTRACT

Techniques are disclosed for defining a network slice template (NST) for provisioning a network slice based on one or more network slice subnet templates (NSSTs). For example, a network provisioning system obtains one or more NSSTs. The one or more NSSTs may include a domain-level NSST for a domain-specific network service or a root-level NSST for an end-to-end network service. The network provisioning system defines an NST based on the one or more NSSTs. The network provisioning system deploys a network slice in accordance with the NST. In some examples, the network slice is a 5G communications network slice.

16 Claims, 27 Drawing Sheets

(56) References Cited

U.S. PATENT DOCUMENTS

| | | | |
|---|---|---|---|
| 7,716,586 | B2 | 5/2010 | Dieberger et al. |
| 8,352,620 | B2 | 1/2013 | Conrad |
| 9,621,428 | B1 | 4/2017 | Lev et al. |
| 10,496,692 | B1 | 12/2019 | Kahrs et al. |
| 10,965,544 | B2 | 3/2021 | Embarmannar Vijayan |
| 11,115,920 | B1 * | 9/2021 | Seetharaman ........ H04W 24/08 |
| 12,177,683 | B2 | 12/2024 | Gadalin et al. |
| 2003/0210284 | A1 | 11/2003 | Vandruff et al. |
| 2003/0214517 | A1 | 11/2003 | Gossweiler et al. |
| 2008/0109731 | A1 | 5/2008 | Chang et al. |
| 2013/0268861 | A1 | 10/2013 | Bailey et al. |
| 2013/0311891 | A1 | 11/2013 | Sankala et al. |
| 2015/0280996 | A1 | 10/2015 | Berube et al. |
| 2016/0353465 | A1 * | 12/2016 | Vrzic ................. H04L 41/5054 |
| 2018/0131585 | A1 | 5/2018 | Bliesner et al. |
| 2019/0021010 | A1 * | 1/2019 | Senarath ............... H04W 16/10 |
| 2019/0109768 | A1 | 4/2019 | Senarath et al. |
| 2020/0014608 | A1 | 1/2020 | Xu et al. |
| 2020/0221346 | A1 | 7/2020 | Park et al. |
| 2022/0210669 | A1 * | 6/2022 | Yu ........................... H04W 4/50 |
| 2023/0045460 | A1 * | 2/2023 | Ho ........................ H04W 88/18 |
| 2023/0276211 | A1 * | 8/2023 | Kozlova ................. H04W 4/50 |
| | | | 455/224 |
| 2025/0080418 | A1 * | 3/2025 | Pathak ................... H04L 43/16 |

FOREIGN PATENT DOCUMENTS

| | | | | | |
|---|---|---|---|---|---|
| CN | 114071657 | A | | 2/2022 | |
| WO | 2017218276 | A1 | | 12/2017 | |
| WO | WO-2021181408 | A1 | * | 9/2021 | ........... H04L 41/342 |
| WO | WO-2021210808 | A1 | * | 10/2021 | ........... H04W 24/02 |

OTHER PUBLICATIONS

Communication pursuant to Article 94(3) EPC from counterpart European Application No. 22212295.4 dated Jan. 28, 2025, 5 pp.

Extended Search Report from counterpart European Application No. 22212295.4 dated Jun. 27, 2023, 11 pp.

Huawei et al., "Add Potential Solutions for NST and NSST", Telecom Management Meeting #112, Huawei, Guilin China, Mar. 27-31, 2017, 4 pp.

Response to Extended Search Report dated Jun. 27, 2023, from counterpart European Application No. 22212295.4 filed Feb. 26, 2024, 22 pp.

First Office Action and Search Report, and translation thereof, from counterpart Chinese Application No. 202211596464.4 dated Aug. 16, 2025, 16 pp.

Response to Communication pursuant to Article 94(3) EPC dated Jan. 28, 2025, from counterpart European Application No. 22212295.4 filed May 28, 2025, 16 pp.

* cited by examiner

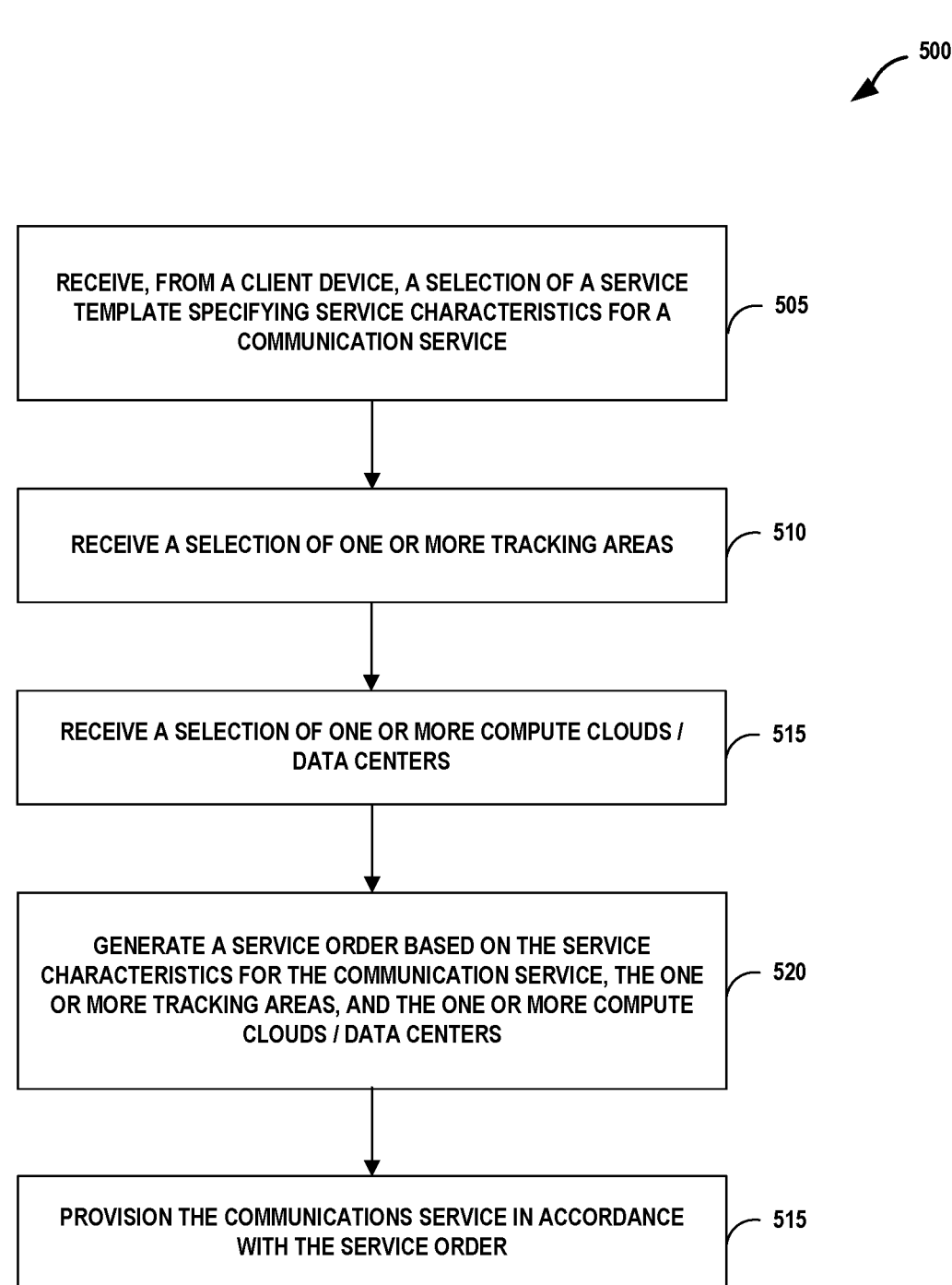

500

RECEIVE, FROM A CLIENT DEVICE, A SELECTION OF A SERVICE TEMPLATE SPECIFYING SERVICE CHARACTERISTICS FOR A COMMUNICATION SERVICE — 505

RECEIVE A SELECTION OF ONE OR MORE TRACKING AREAS — 510

RECEIVE A SELECTION OF ONE OR MORE COMPUTE CLOUDS / DATA CENTERS — 515

GENERATE A SERVICE ORDER BASED ON THE SERVICE CHARACTERISTICS FOR THE COMMUNICATION SERVICE, THE ONE OR MORE TRACKING AREAS, AND THE ONE OR MORE COMPUTE CLOUDS / DATA CENTERS — 520

PROVISION THE COMMUNICATIONS SERVICE IN ACCORDANCE WITH THE SERVICE ORDER — 515

FIG. 5

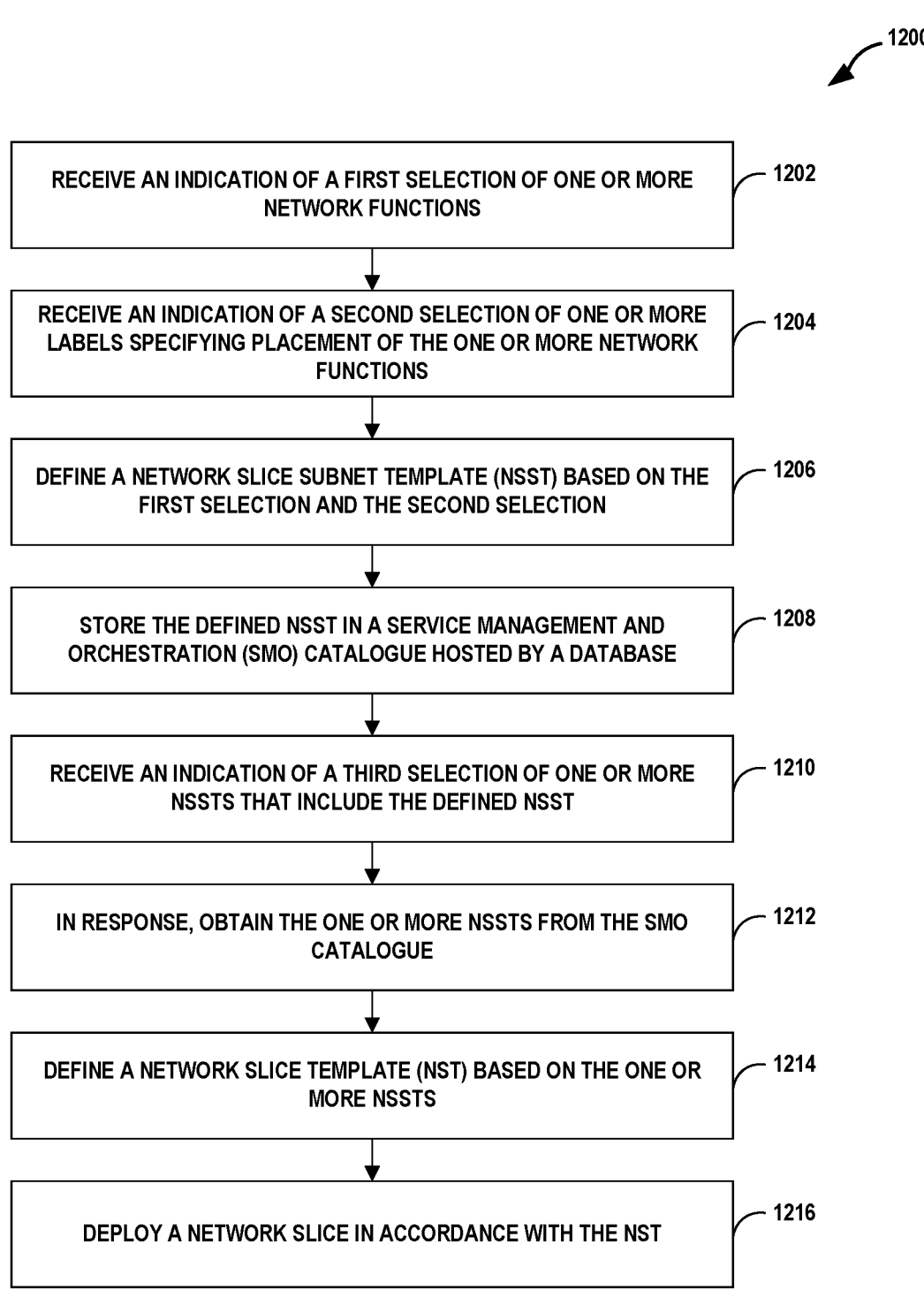

1200

RECEIVE AN INDICATION OF A FIRST SELECTION OF ONE OR MORE NETWORK FUNCTIONS — 1202

RECEIVE AN INDICATION OF A SECOND SELECTION OF ONE OR MORE LABELS SPECIFYING PLACEMENT OF THE ONE OR MORE NETWORK FUNCTIONS — 1204

DEFINE A NETWORK SLICE SUBNET TEMPLATE (NSST) BASED ON THE FIRST SELECTION AND THE SECOND SELECTION — 1206

STORE THE DEFINED NSST IN A SERVICE MANAGEMENT AND ORCHESTRATION (SMO) CATALOGUE HOSTED BY A DATABASE — 1208

RECEIVE AN INDICATION OF A THIRD SELECTION OF ONE OR MORE NSSTS THAT INCLUDE THE DEFINED NSST — 1210

IN RESPONSE, OBTAIN THE ONE OR MORE NSSTS FROM THE SMO CATALOGUE — 1212

DEFINE A NETWORK SLICE TEMPLATE (NST) BASED ON THE ONE OR MORE NSSTS — 1214

DEPLOY A NETWORK SLICE IN ACCORDANCE WITH THE NST — 1216

FIG. 12

5G SLICE SUBNET TEMPLATES FOR NETWORK SLICE PROVISIONING

This application claims the benefit of Greece Application No. 20220100182 which was filed on Feb. 28, 2022, the entire content of which is incorporated herein by reference.

TECHNICAL FIELD

The disclosure relates to computer networking, and more specifically to ordering and provisioning communication services in a network.

BACKGROUND

Computer networks have become ubiquitous, and the number of network applications, network-connected devices, and types of network-connected devices are rapidly expanding. Such devices now include computers, smart phones, Internet-of-Things (IoT) devices, vehicles, medical devices factory equipment, etc. 5G network architectures enhanced the ability to provide communication services using network function virtualization (NFV). Specialized networks can be created using the Radio Access Network (RAN) of a mobile network operator combined with functions of a 5G core. For example, networks can be created for a specific service level agreement (SLA), special use cases, or other specific requirements. Examples of such networks include private mobile networks, industrial networks, a dedicated network for connected vehicles, etc.

SUMMARY

In general, the disclosure describes techniques for on-demand provisioning of services in a network, for example, a 5G network. Using the techniques disclosed herein, an end-user of a service can request that a network operator provision the service using a workflow that begins with selecting a service template that matches the service to be provisioned. A network service provider can provide a portal to a network provisioning system where the portal presents visual cues via a user interface that provides visualizations of the service provisioning process and receives user input that, in some cases, can be selected from the visualizations. In some aspects, the user can be a tenant (e.g., a customer) of a 5G mobile network operator. As an example, the tenant may be an enterprise customer of the mobile network operator. In some aspects, the user can be an administrator of a 5G network service provider.

Provisioning a service in a 5G network domain can involve multiple services and multiple service providers. For example, provisioning an end-to-end 5G network slice may involve provisioning network functions to support the network slice in multiple geographically-distributed data centers ("multi-cloud") and may further involve services provided and implemented in multiple network domains ("multi-domain") such as Radio Access Networks (RAN), transport networks, core network services, and service gateway interfaces (SGi). The different services and network domains may have different capabilities, functions, and service levels. A tenant may want to provision a complete communication service, and in some cases related network slices, to a network infrastructure owned or leased by the tenant. In existing systems, the tenant may contact the mobile network operator (MNO) to request that the service be provisioned. A network administrator may need to use a variety of different configuration interfaces and configuration parameters in order to provision the service. There can be significant wait times while the tenant waits for the mobile network operator to provision the service. This can be frustrating for the tenant, leading to a poor user experience. Further, the complexity and variety of interfaces and parameters can lead to significant errors during the provisioning process.

According to the techniques disclosed herein, a tenant (or network service provider for a provider-owned slice) can initiate, on-demand, provisioning of a communication service with a pre-defined service level agreement (SLA) and network slice templates (NSTs), and the tenant can specify different attributes of the service, e.g., tracking areas, compute clouds/data centers, allowed subscribers, network slice selection policies, etc. The communication service can be ordered by an end-user via a user interface that provides for profile selection and visual cues for selecting tracking areas, subscribers, data centers, etc. The techniques disclosed herein can facilitate a service order creation process that can be used by an end-user to request on-demand provisioning of an end-to-end network that can be created for specific SLA, use cases, and user requirements. In some aspects, the end-user can be a tenant of a mobile network operator that can provision communication services on an on-demand basis.

A network service provider such as a mobile network operator can utilize the techniques described herein to provide networking as a service (NaaS) to their customers. For example, the techniques can facilitate end-user and on-demand provisioning of private mobile networks. Examples of such private mobile networks include dedicated networks for connected vehicles, Internet-of-Things (IoT) networks, networks for industries etc. In some aspects, the network service provider may create, on demand, a network slice having QoS and other parameters based on a service order generated by a tenant or other end-user via an interface implementing techniques described herein.

The techniques disclosed herein include a provisioning portal that provides a user interface facilitating creation of service orders by tenants and other clients of a network operator. The user interface can lead a user through a series of operations of a workflow that can result in the creation of a service order that can instruct a provisioning system to configure and deploy a network service for the user. In some aspects, the communication service can be localized to a particular geographic area by providing an interface for a user to select components involved in providing the communication service from a map. The techniques disclosed herein can provide a technical advantage over previous systems by enabling end-users to perform on-demand provisioning of communication services. As a practical application of the techniques described in this disclosure, a provisioning portal can be used by an end-user tenant of a network operator to provision communication services of the network operator for use by the tenant. The provisioning portal can facilitate an end-user ordering a network service and have the network service provisioned on-demand without involving mobile network operator personnel. As a result, a tenant may be able to receive the benefits of the communication server sooner when compared with existing systems. Further, there may be less overhead for a mobile network operator. Moreover, the techniques allow a user to specify a localized geographic area for the service.

In one example, this disclosure describes a method comprising obtaining, by processing circuitry, one or more network slice subnet templates (NSSTs); defining, by the processing circuitry, a network slice template (NST) based on the one or more NSSTs; and deploying, by the processing circuitry, a network slice in accordance with the NST.

In another example, this disclosure describes a computing system comprising processing circuitry having access to a memory, the processing circuitry configured to: obtain one or more network slice subnet templates (NSSTs); define a network slice template (NST) based on the one or more NSSTs; and deploy a network slice in accordance with the NST.

In another example, this disclosure describes a method comprising: receiving, by processing circuitry, an indication of a first selection of one or more network functions; receiving, by the processing circuitry, an indication of a second selection of one or more labels specifying placement of the one or more network functions; defining, by the processing circuitry and based on the first selection and the second selection, a network slice subnet template (NSST); storing, by the processing circuitry and to a Service Management & Orchestration (SMO) catalogue of NSSTs hosted by a database, the defined NSST; receiving, by the processing circuitry, an indication of a third selection of one or more NSSTs, the one or more NSSTs including the defined NSST; in response to the indication of the third selection, obtaining, by the processing circuitry and from the SMO catalogue, the one or more NSSTs; defining, by the processing circuitry, a network slice template (NST) based on the one or more NSSTs; and deploying, by the processing circuitry, a network slice in accordance with the NST.

The details of one or more examples are set forth in the accompanying drawings and the description below. Other features, objects, and advantages will be apparent from the description and drawings, and from the claims.

BRIEF DESCRIPTION OF DRAWINGS

FIG. 5 is a flowchart illustrating operations of a method for provisioning network services, according to techniques of the disclosure.

FIG. 12 is a flowchart illustrating an operation for provisioning network services, according to techniques of the disclosure.

DETAILED DESCRIPTION

Figure 1:
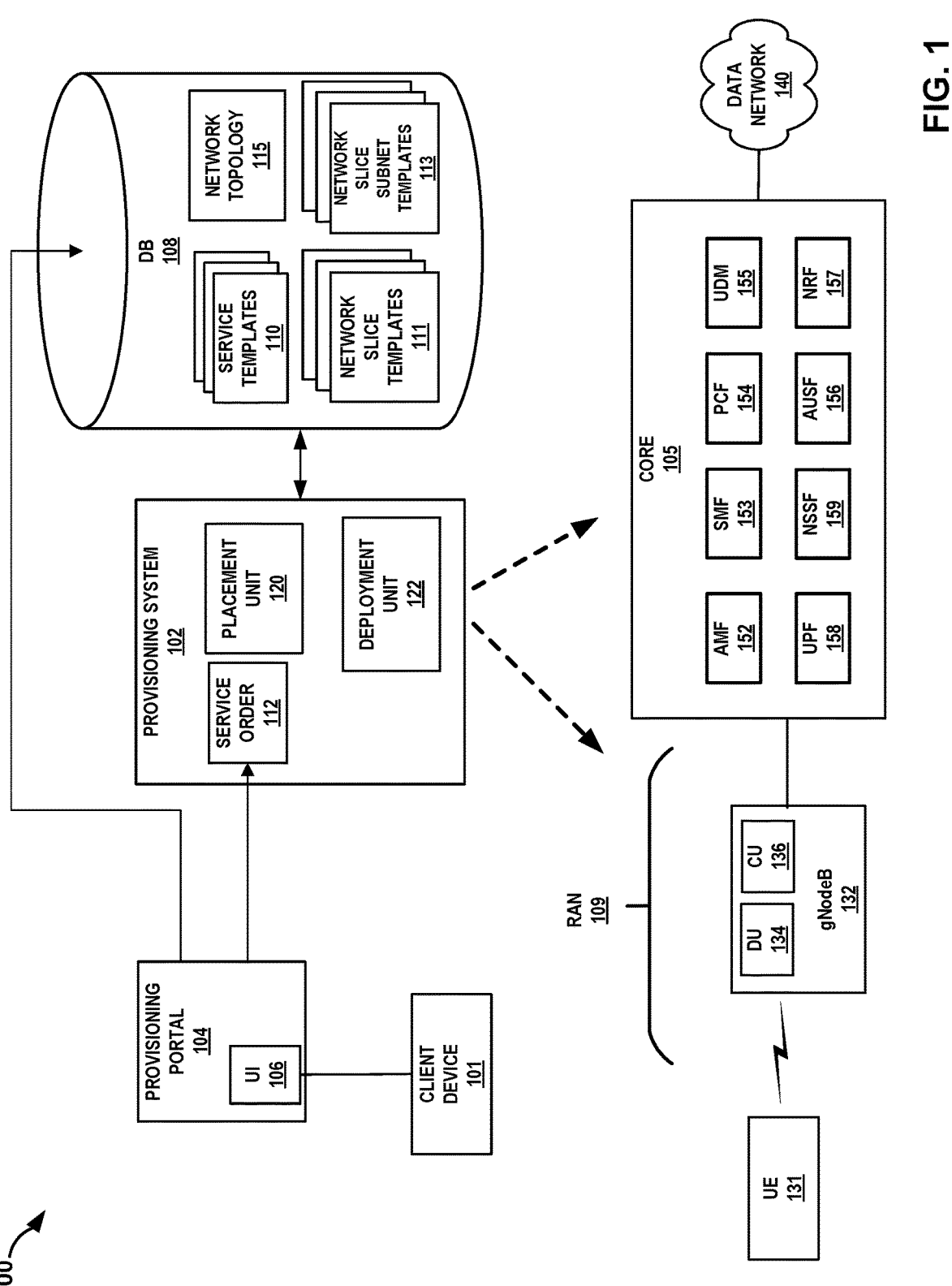
FIG. 1 is a block diagram illustrating an example network system, according to techniques of the disclosure.

FIG. 1 is a block diagram illustrating an example network system, according to techniques of the disclosure. In the example illustrated in FIG. 1, network system 100 includes provisioning system 102, provisioning portal 104, one or more radio access networks (RANs) 109, and core 105. Provisioning system 104 provisions communication services for customer of a network operator, for example, a mobile network operator. As an example, a tenant may order a communication service from a mobile network operator. The desired service may be described in service order 112. Provisioning system 102 processes the service order and may assign communications infrastructure and resources needed to provide the desired service to the tenant based on information in service order 112.

In some aspects, resources associated with the service to the tenant may be provided by, or managed by, functions of core 105 and/or components of RAN 109. In some aspects, core 105 implements various discrete control plane and user plane functions for network system 100. In some aspects, core 105 includes 5G control plane functions such as Access Mobility Management Function (AMF) 152, Session Management Function (SMF) 153, Policy Control Function (PCF) 154, User Data Management (UDM) 155, Network Repository Function (NRF) 157, Authentication Server Function (AUSF) 156, and Network Slice Selection Function (NSSF) 159. AMF 152 may provide access mobility management services. SMF 153 may provide session management services. PCF 154 may provide policy control services. Unified Data Management (UDM) function 155 may manage network user data. AUSF 156 may provide authentication services. Network Repository Function (NRF) 157 may provide a repository that can be used to register and discover services in a network operator's network. Network Slice Selection Function (NSSF) 159 may be used to select an instance of an available network slice for use by a user equipment (UE) device 131. Core 105 may also include User Plane Functions (UPF) 158. UPF 158 may provide packet routing, forwarding and other network data processing functions (e.g., Quality of Service, packet inspection, traffic optimization etc.). Further details on services and functions provided by AMF 152, SMF 153, PCF 154, UDM 155, NRF 157, AUSF 156 NRF 157, UPF 158 and NSSF 159 can be found in $3^{rd}$ Generation Partnership Project 2021, *Technical Specification Group Services and System Aspects; System architecture for the 5G System (5GS); Stage 2 (Release 17)*, TS 23.501 V17.0.0 (2021-03), the entire contents of which is hereby incorporated by reference.

In some examples, RANs 109 include radio units (RUs) located at various cellular network sites ("cell sites"), along with distributed units (DUs) and centralized units (CUs). Each RU consists of an LO PHY and a RF transmitter. The LO PHY component may be implemented using specialized hardware for high-performance packet processing.

RUs can connect to DUs via a fronthaul network. The fronthaul network connects LO PHY and HI PHY and is used by RUs and DUs to implement the F2 interface of 5G. DUs manage the packet transmission of radio by the RUs. In some cases, such packet transmission conforms to the Common Packet Radio Interface (CPRI) and/or to the enhanced CPRI (eCPRI) standard, or to IEEE 1914.3. DUs may implement the Radio Link Control (RLC), Media Access Control (MAC), and the HI PHY layer. DUs are at least partially controlled by CUs.

DUs can connect to CUs via a midhaul network, which may be used by DUs and CUs to implement the F1 interface of 5G. CUs may implement the Radio Resource Control (RRC) and Packet Data Convergence Protocol (PDCP) layers. CUs connect to core 105 via a backhaul network. The midhaul and backhaul networks may each be wide area networks (WANs).

RANs 109 may include a gNodeB 102. In some examples of radio access networks 109 of network system 100, gNodeB 102 includes a CU 136 and a DU 134. CU 136 may support multiple DUs to implement multiple gNodeBs. Further, one or more RUs may be supported by a single DU 134.

Any DU may or may not be located at the cell site that includes the RU(s) supported by the DU. A DU may be located at a cell site, while other DUs may be located at a local data center and collectively support multiple RUs. Network system 100 may have radio access networks 109 that include many thousands of cell sites and gNodeBs.

Radio access networks 109 connect to core 105 to exchange packets with data network 140. Core 105 may be a 5G core network, and data network (DN) 140 may represent, for example, one or more service provider networks and services, the Internet, 3rd party services, one or more IP-VPNs, an IP-multimedia subsystem, a combination thereof, or other network or combination of networks.

Provisioning portal 104 provides an interface for use by client device 101 to provision communication services. In some aspects, provisional portal 104 can present a user interface 106 that presents user interface elements (e.g., screens, menus, maps, etc.) as part of a workflow for provisioning a communication service. In some aspects, the user interface and workflow can be an "end-to-end" workflow such that when the workflow is completed, there is enough information available to provisioning portal to create service order 112 that can be used by provisioning system 102 for provisioning a desired communication service.

Client device 101 can be an end-user computing device that receives user interface 106 elements for presentation, via a display coupled to client device 101, to a user operating client device 101. In some aspects, client device 101 may be operated by a tenant of a mobile network operator and used to order a desired communication service. In some aspects, client device 101 may be operated by mobile network operator personnel and used to provision communication services for tenants or for the use of the mobile network operator. For example, a mobile network operator may use the provisioning portal to provision slices to carry voice traffic, web browsing traffic, or other types of traffic.

Provisioning portal 104 can be communicatively coupled to client device 101 and provisioning system 102. In the example illustrated in FIG. 1, provisioning portal 104 is executed in a computing environment, which may be provided by a cloud service provider or at a branch office of the MNO. However, provisioning portal 104 may be executed in other environments. Provisioning portal 104 may be a component of provisioning system 102. Further, provisioning portal 104 may be a component of a server or other computing device in a data center, such as a data center of a mobile network operator. In addition, some operations attributed herein to provisioning system 102 or provisioning portal 104 may in various example be performed by either provisioning system 102 or provisioning portal 104.

In some aspects, communication services that may be provisioned using provisioning portal 104 include network slices. In 5G network environments, network slicing is a network architecture that facilitates creations of multiple virtualized and independent logical networks that are multiplexed over the same physical network infrastructure. A network slice can be logically isolated from other network slices and can be customized to meet service level expectations of an application that may be established by a service level agreement (SLA). In the example illustrated in FIG. 1, provisioning system 102 can create and allocate network slices on the mobile network operator's access network to data network 140.

In some aspects, a mobile network operator may create network slice templates 111. A network slice template 111 can be a blueprint that defines various network slice attributes used to configure a network slice. For example, a network slice template 111 can define networks and services used by a slice and interfaces to such networks and services. The network slice template may be used to create a slice that may be tailored for a particular purpose. For example, network slice templates 111 may include a template for creating a network slice to carry video streams, a template for creating a network slice to carry cloud gaming network traffic, a template for creating a network slice to carry artificial reality traffic, etc.

In accordance with the techniques of the disclosure, a mobile network operator may create network slice subnet templates 113. A network slice subnet template 113 can be a blueprint that defines various network slice subnet attributes used to configure a network slice subnet. For example, one or more network slice subnet templates 113 may be used to define networks and services used by a slice subnet and interfaces to such networks and services. One or more network slice subnet templates 113 may be used to define different portions of a network slice. As described in more detail below, an end-to-end network slice may be defined from a network slice template 111, whereas the network slice template 111 may be defined from various per-configured network slice subnet templates 113.

Figure 2:
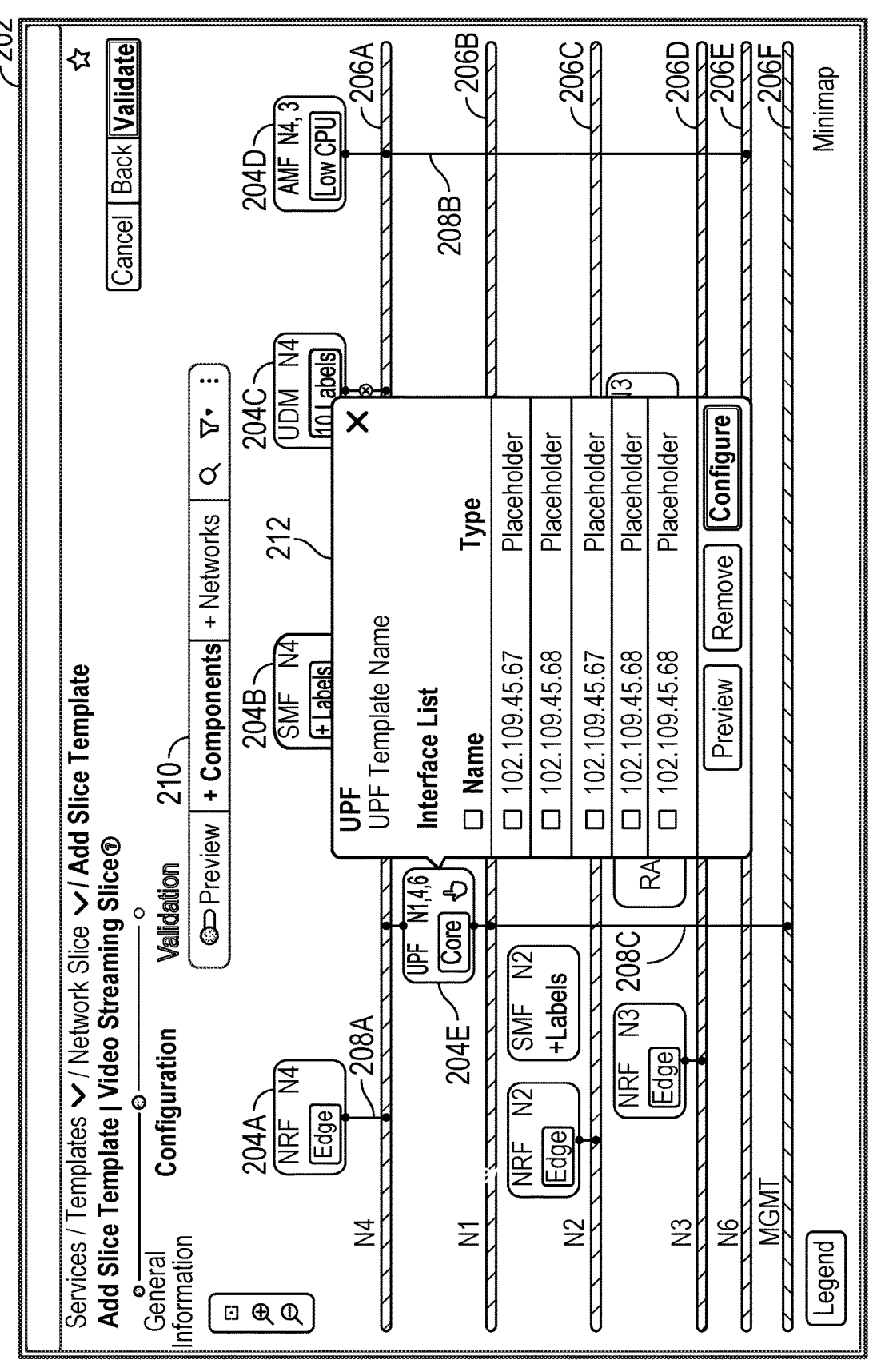
FIG. 2 is a conceptual view of a user interface screen for adding a network slice template, according to techniques of the disclosure.

FIG. 2 is a conceptual view of a user interface screen for adding a network slice template, according to techniques of the disclosure. FIG. 2 will be discussed in conjunction with aspects of FIG. 1. Slice template screen 202 may be used, for example, by a mobile network operator to define network slice templates for use by tenants in ordering and provisioning communication services. In some aspects, slice template screen 202 may be provided by user interface 106 of provisioning portal 104. In the example illustrated in FIG. 2, interface screen 202 includes graphical elements representing components used to implement a network slice, including network functions 204A-204E, interfaces 206A-206F, and connections 208A-208C. In some aspects, a function 204 may be any of functions 152-159 of core 105. Slice template screen 202 can provide a user interface to incorporate network functions 204A-204E and network interfaces 206A-206F into a network slice template. Slice template screen 202 can also be used to create and display connections 208 between interfaces 204 and functions 206. Provisioning portal 104 may obtain available functions, interfaces, and other network infrastructure elements to use when defining a network slice template from network topology 115 of database 108.

A user may utilize slice template screen 202 to add slice components such as functions 204 and interfaces 206 using control 210 to a network slice definition. After functions 204 and interfaces 206 are added to a network slice template, the user may utilize the interface provided in screen 202 to connect functions to interfaces. In the example illustrated in FIG. 2, NRF function 204A has been connected to N4 interface 206A, AMF function 204D has been connected to N4 interface 206A and N3 interface 206D, UPF interface 204E has been connected to N4 interface 206A, N1 interface 206B, and N6 interface 206E. Interface 206F can be a virtual network that connects multiple network functions. In the example shown in FIG. 2, management interface 206F can be a virtual network with management capabilities that connects multiple network functions. The network slice template, once created, can be used as a blueprint to create video streaming slices.

In some aspects, a function 204 may be assigned one or more labels using slice template screen 202. In the example, illustrated in FIG. 2, NRF function 204A has been assigned a label "Edge," AMF function 204D has been assigned a label "Low CPU," and UPF function 204E has been assigned the label "Core." Other functions 204 shown in FIG. 2 have also been assigned labels. During deployment of a slice created using the template, provisioning system 102 may use a label for a function 204 to match functions used by the provisioned slice to network infrastructure such as compute clouds or compute nodes. For example, a function having an "Edge" label may indicate that it is desirable (or even mandatory) that provisioning system 102 assign the function to resources in an edge compute cloud. For instance, it may be desirable that NRF function 204A be available with low latency, thus making it more desirable for provisioning system 102 to locate NRF function 204A at an edge of the network slice infrastructure. In this case, NRF function 204A has been assigned an "Edge" label. As a further example, a "Core" label may indicate that it is desirable that the network function be assigned to resources closer to the core of the 5G network slice. For example, User Plane Function (UPF) 204 carries data between a data network and user equipment and it may be desirable to locate UPF 204 closes to the data network (e.g., closer to the core). Other location-related labels may include "regional" or "national". A "low CPU" label may indicate that the function does not require high performance processing capability and can thus be assigned to resources that utilize lower performance processors. A "SmartNIC" label may indicate the function should be deployed to a compute node having a SmartNIC. Other labels may indicate the type of orchestration system for deployed the labeled function, such as "OpenShift", "OpenStack", or "Kubernetes". If a data center or cloud is not capable of supporting a capability associated with a label, the data center or cloud is not able to host the labeled function and may not be selectable in the portal user interface 106 by the user.

In some aspects, a user may utilize slice template screen 202 to obtain further information from components displayed on screen 202. In the example shown in FIG. 2, a user has selected UPF function 204E and, in response, provisioning portal 104 displays, on screen 202, information box 212 about UPF function 204E, including information related to the in interfaces of UPF function 204E. Information box 212 can include control elements (e.g., buttons, menus etc.) to configure the selected element (UPF function 204E in this example), remove the selected element, or preview the selected element. In some aspects, in response to selection of the preview control element, provisioning portal 104 displays the constituent network functions, configuration, and interfaces of the selected element. If the element currently has no constituent elements, the preview control element may be disabled.

After a user has defined a network slice template, for example, using screen 202, the user may assign a name to the network slice template and save the network slice template in database 108 as one of network slice templates 111 for later use in the on-demand provisioning of service facilitated by network system 100.

Returning to FIG. 1, database 108 may also include service templates 110. A mobile network operator may define (perhaps using user interface 106) service templates 110. Service templates 110 can include various templates that have predefined network service attributes that may be appropriate for various types of communication services. For example, service templates 110 may include templates that have predefined attributes that may be appropriate for network slices that are intended to carry enhanced mobile broadband (eMBB) network traffic, massive machine-type communications (mMTC) traffic, ultra-reliable and low-latency communications (URLLC) network traffic, video stream network traffic, augmented reality/virtual reality network traffic, cloud gaming network traffic, etc. Network service attributes can include labels identifying characteristics of components of a network service, core functions or other functions used to provide the communication service, interfaces used by the communication service, SLAs, throughput rates, latency characteristics, uplink and downlink limits, maximum number of user equipment (UE) devices allowed for the service, priority of the service, maximum sessions supported by the service, etc. A service template can serve as a blueprint for on-demand provisioning of communication services. For example, a tenant of a mobile network operator may select a service template as described below to perform on-demand ordering and provisioning of a communication service having attributes defined by the selected template.

FIGS. 3A-3G are conceptual views of user interface screens for on-demand ordering and provisioning a communication service, according to techniques of the disclosure. The user interface screens of FIGS. 3A-3G will be discussed in conjunction with aspects of FIG. 1. Generally speaking, the user interface screens of FIGS. 3A-3G are part of a workflow that a tenant of a mobile network operator (or the mobile network operator itself) may perform to request on-demand provisioning of a communication service. The user interface screens illustrated in the examples of FIGS. 3A-3G may be provided to client device 101 by user interface 106 for presentation on a display of client device 101.

Figure 3A:
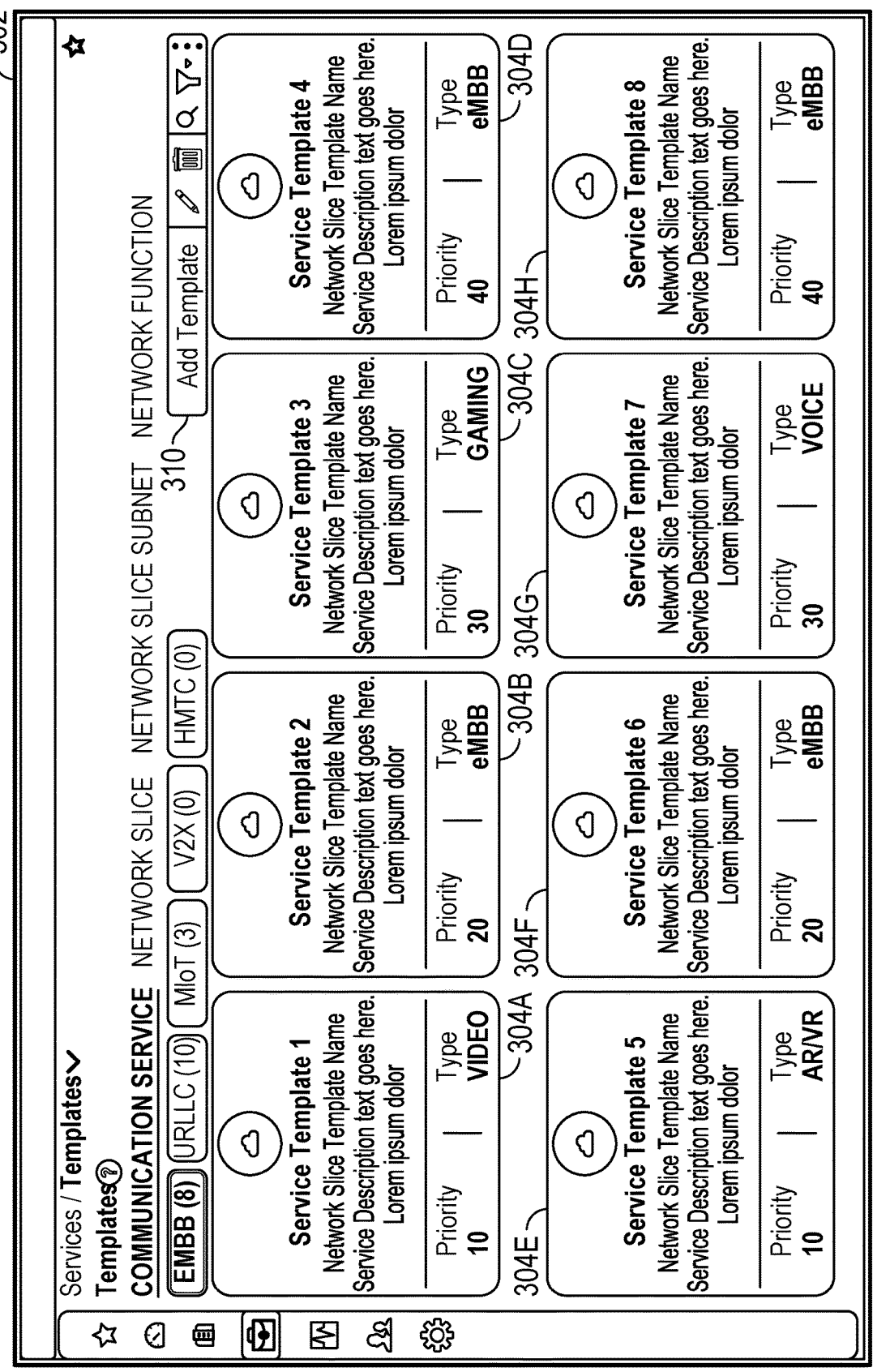
FIGS. 3A-3G are conceptual views of user interface screens for provisioning a network service, according to techniques of the disclosure.

FIG. 3A is a conceptual view illustrating a service template selection screen 302, according to techniques of the disclosure. In some aspects, service template selection screen includes template icons 304A-304H (collectively "template icons 304") that each represent a different service template defined in service templates 110. In some aspects, a template icon can include the name of the template, a description of the template, a network slice template specified by the service template, a priority for network traffic for the provisioned service, and a type of service. A user desiring to provision a new communication service may utilize user interface 106 to select one of template icons 304 that most closely represents the type of communication service the user desires to provision.

Service template selection screen 302 include a control interface element 310 that include user interface elements that, when selected, cause the provisioning portal 104 to perform an action. For example, control interface element 310 includes an "add template" component that, when selected, causes provisioning portal 104 to present a user interface to configure a new service template. Other components of control interface element 310 can cause provisioning portal 104 to apply filters to service templates 304 and/or search for specific service templates 304.

Figure 3B:
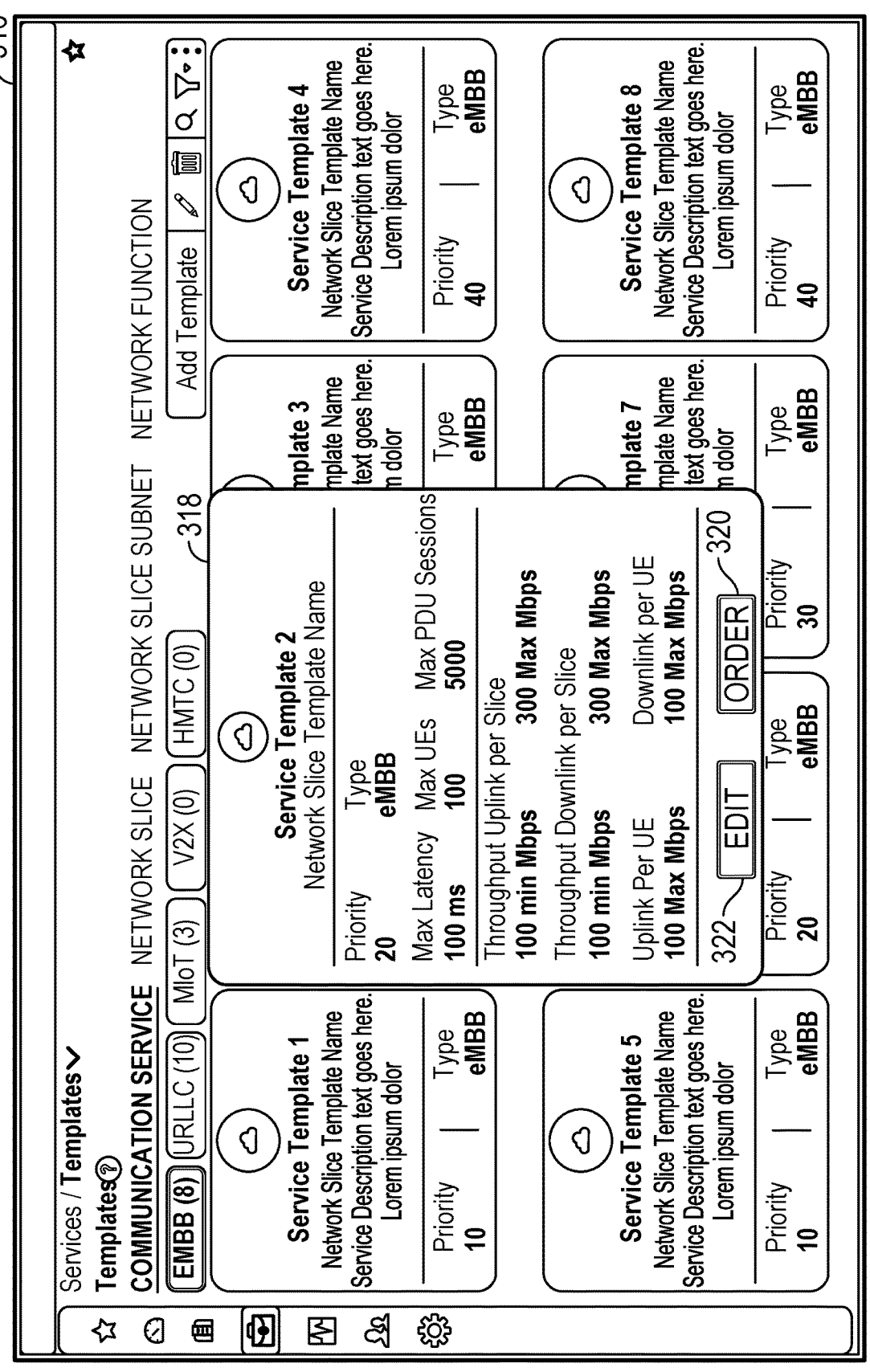

FIG. 3B is a conceptual view illustrating a service template definition screen 318, according to techniques of the disclosure. In the example illustrated in FIG. 3B, service template definition screen 318 is shown in response to selection of template icon 304B of FIG. 3A. Service template definition screen 318 displays attributes of the selected service template. Examples of such attributes include the priority of network traffic carried by a network slice created using the template (e.g., "20"), a type of network traffic carried by the network slice (e.g., "eMBB"). The attributes may also include service level attributes. For example, in the example illustrated in FIG. 3B, the template specifies a maximum latency (e.g., "100 ms), the maximum number of UEs for the communication service (e.g., "100"), and the maximum number of protocol data unit (PDU) sessions for the communication service (e.g., "5000"). Other SLA attributes that may specified include minimum and maximum uplink throughput for the network slice (e.g., "100 Mbps" and "300 Mbps" respectively), a minimum and maximum downlink throughput for the network slice (e.g., "100 Mbps" and "300 Mbps" respectively), and maximum uplink and downlink throughput per UE device (e.g., "100 Mbps" and "100 Mbps" respectively).

Service template definition screen may include an edit user interface element 322 and an order user interface element 320. In response to selection of edit user interface element 322, UI 106 of provisioning portal 104 can present an interface that can be utilized by a user to change various attributes from the default values provided by the selected service template. In response to selection of order user interface element 320, UI 106 of provisioning portal can present further user interface screens that to continue with a service order workflow. In some aspects, provisioning portal 104 may provide an estimated cost to the tenant for a service that is provisioned according to the selected template. For example, a communication service provisioned using a service template that specifies attribute values for a high throughput and/or low latency communication service may be priced higher than a communication service provisioned using a service template that does not specify attribute values for a high throughput and/or low latency communication service.

Figure 3C:
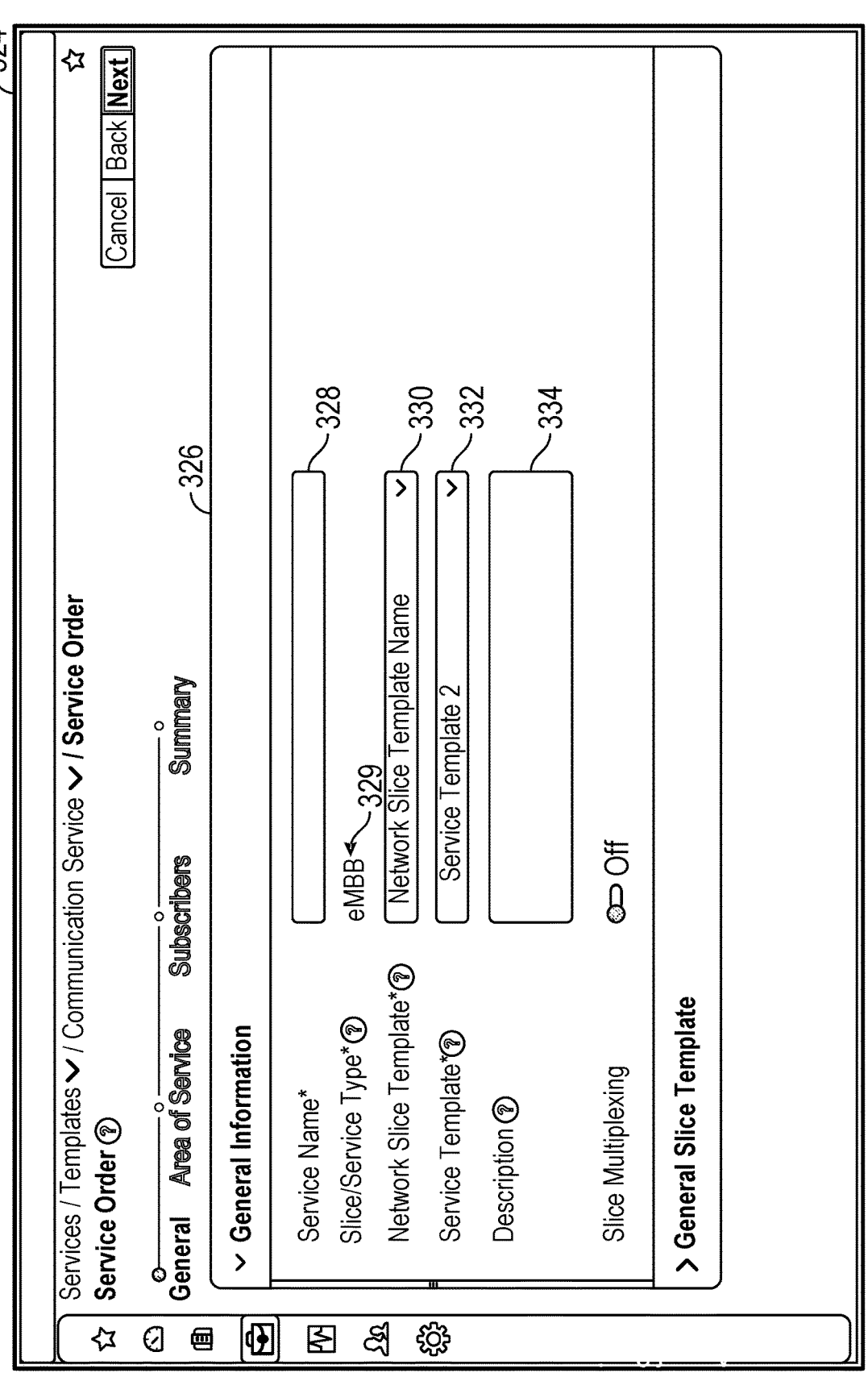

FIG. 3C is a conceptual view illustrating a general information portion 326 for a service order definition screen 324, according to techniques of the disclosure. UI 106 of provisioning portal 104 may present service order definition screen 324 to client device 101 in response to a user of client device 101 selecting the "order" user interface element 320 (FIG. 3B). General information portion 326 includes fields allowing a user to provide a communication service name 328 and a description 334 of the communication service to be provisioned. Additionally, general information portion 326 includes fields that can be used to modify attributes of the communication service from the defaults provided by the service template. For example, general information portion 326 may include service type field 329 that can be utilized to change the service type of the communication service to be provisioned from the default provided by the selected template. Similarly, network slice template field 330 can be used to change the network slice template from the default provided in the service template. Service template field 332 can be used to change the service template for the communication service to be provisioned to a different service template.

Figure 3D:
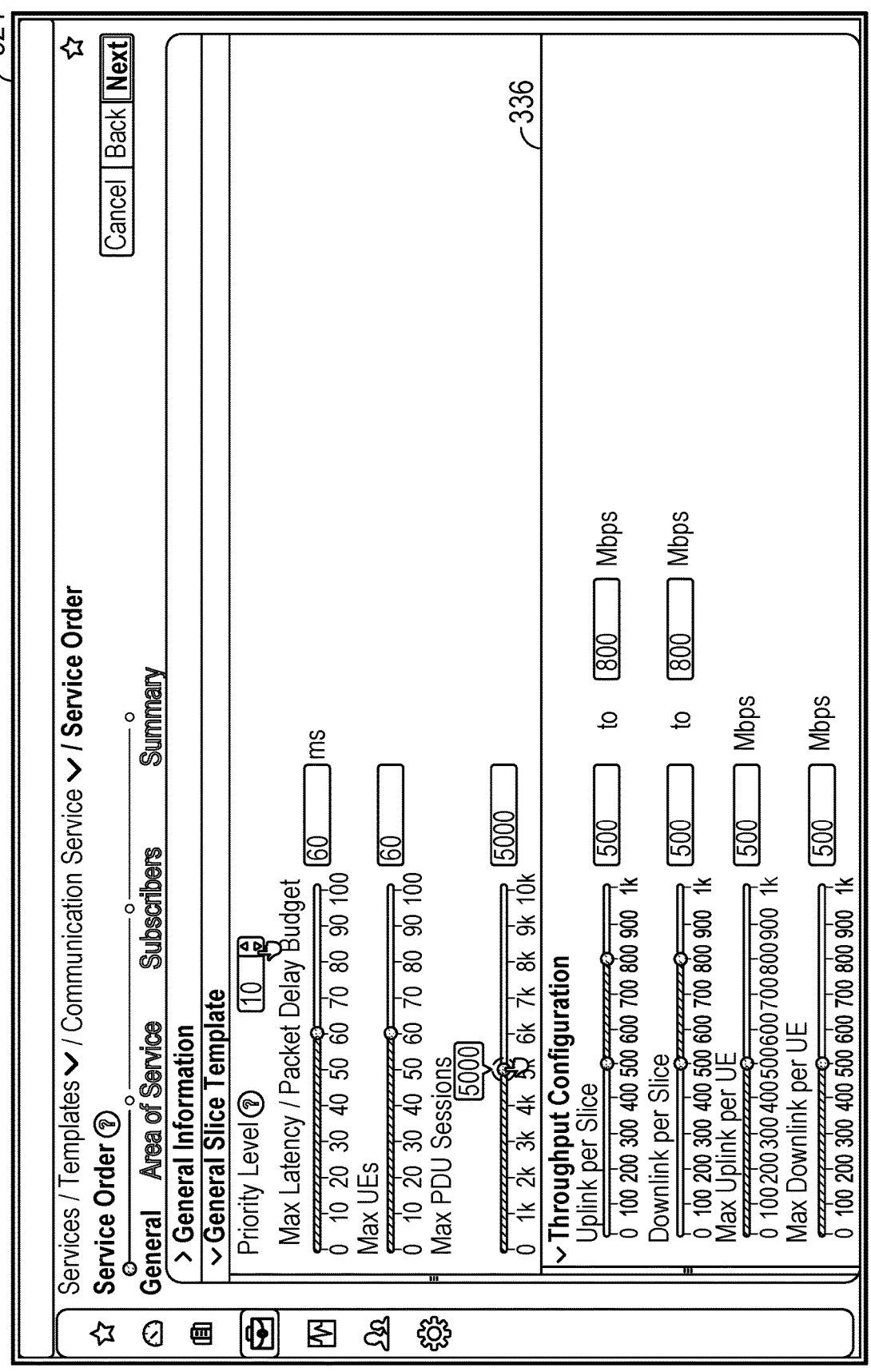

FIG. 3D is a conceptual view illustrating a general slice information portion 336 for a service order definition screen 324, according to techniques of the disclosure. General slice information portion 336 includes fields allowing a user to modify SLA related attributes for the network slice to be provisioned for the communication service. For example, general slice information portion 326 may include user interface elements allowing a user to modify SLA related attributes from the defaults provided by the network slice template associated with the service template. In the example illustrated in FIG. 3D, such attributes include priority, maximum latency, maximum UEs, maximum PDU sessions, minimum and maximum uplink throughput, minimum and maximum downlink throughput, maximum uplink throughput per UE, and maximum downlink throughput per UE.

Figure 3E:
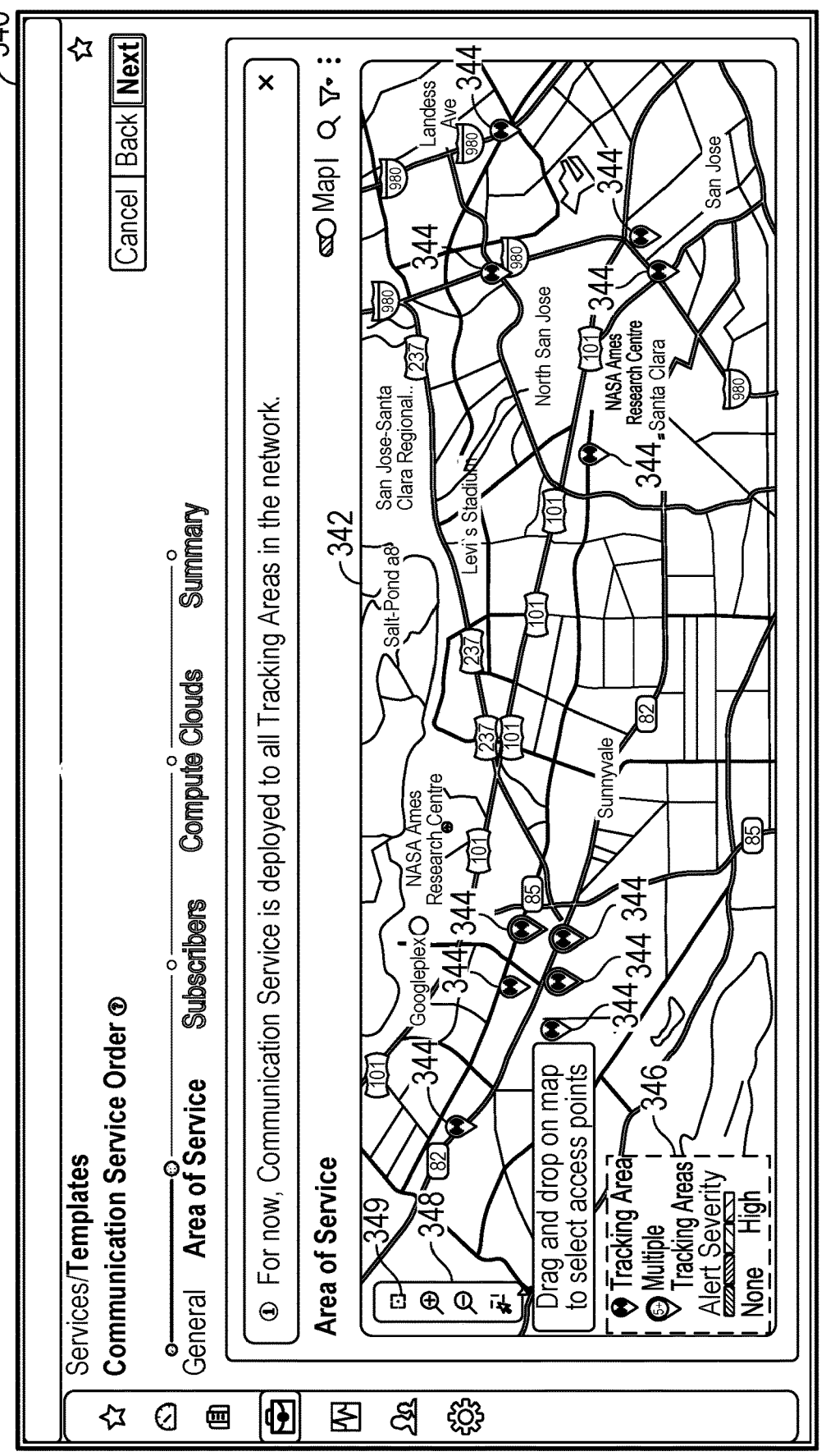

FIG. 3E is a conceptual view illustrating a tracking area selection screen 340 for a service order, according to techniques of the disclosure. Generally speaking, a tracking area is a set of one or more mobile network cells within region that are grouped together to facilitate reducing overhead involved with managing UEs. For example, handshaking protocols can be avoided when A UE moves from one cell in a tracking area to another cell in the same tracking area. A network slice can be associated with multiple tracking areas. Tracking area selection screen 340 of UI 106 provides selection mechanism for associated tracking areas with the network slice to be provisioned as part of a communication service. For example, a tenant may want to localize where a communication service is provided to their subscribers and can do so by selecting the desired tracking areas from selection screen 340. In the example illustrated in FIG. 3E, tracking area selection screen 340 shows a map 342 illustrating tracking areas 344 within a region. A user can utilize tracking area selection screen 340 to select one or more of tracking areas 344 to include in a network slice to be provisioned for the communication service.

Tracking area selection screen 340 includes a legend 346 that explains aspects of the tracking areas 344 shown on tracking area selection screen 340. As an example, legend 346 shows a color coded bar that can indicate an alert condition and severity associated with a tracking area. Tracking area selection screen 340 also includes control menu 348 having interface elements that can be used to select tracking areas 344 within a region, zoom in or zoom out on the map, etc. In some aspects, a user can utilize region selection tool 349 to select tracking areas of the mobile network operator that are within the region bounded by a rectangle formed using region selection tool 349. As an example, a tenant may desire to provide a specialized communication service in or near a stadium. The tenant can use region selection tool 349 to define the desired region around the stadium on map 342.

Figure 3F:
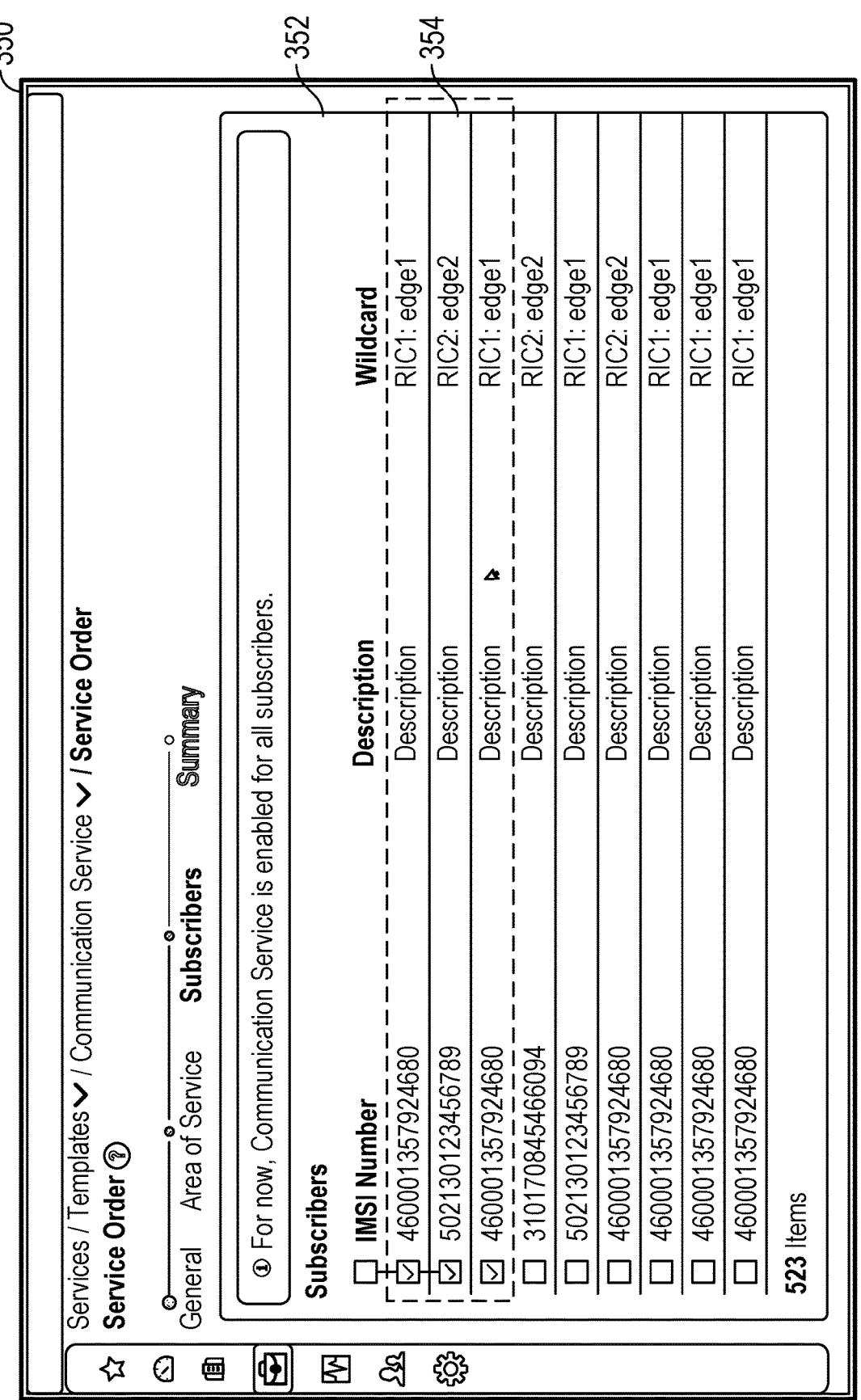

FIG. 3F is a conceptual view illustrating a subscriber screen 350 for a service order, according to techniques of the disclosure. Subscriber screen 350 of UI 106 can present a list 352 of subscribers associated with a tenant that is provisioning a communication service. The tenant can select the subscribers from the list that are to be given access to the communication service being provisioned by the tenant. In the example illustrated in FIG. 3F, a set of subscribers 354 has been selected to be granted access to the communication service once provisioned.

Figure 3G:
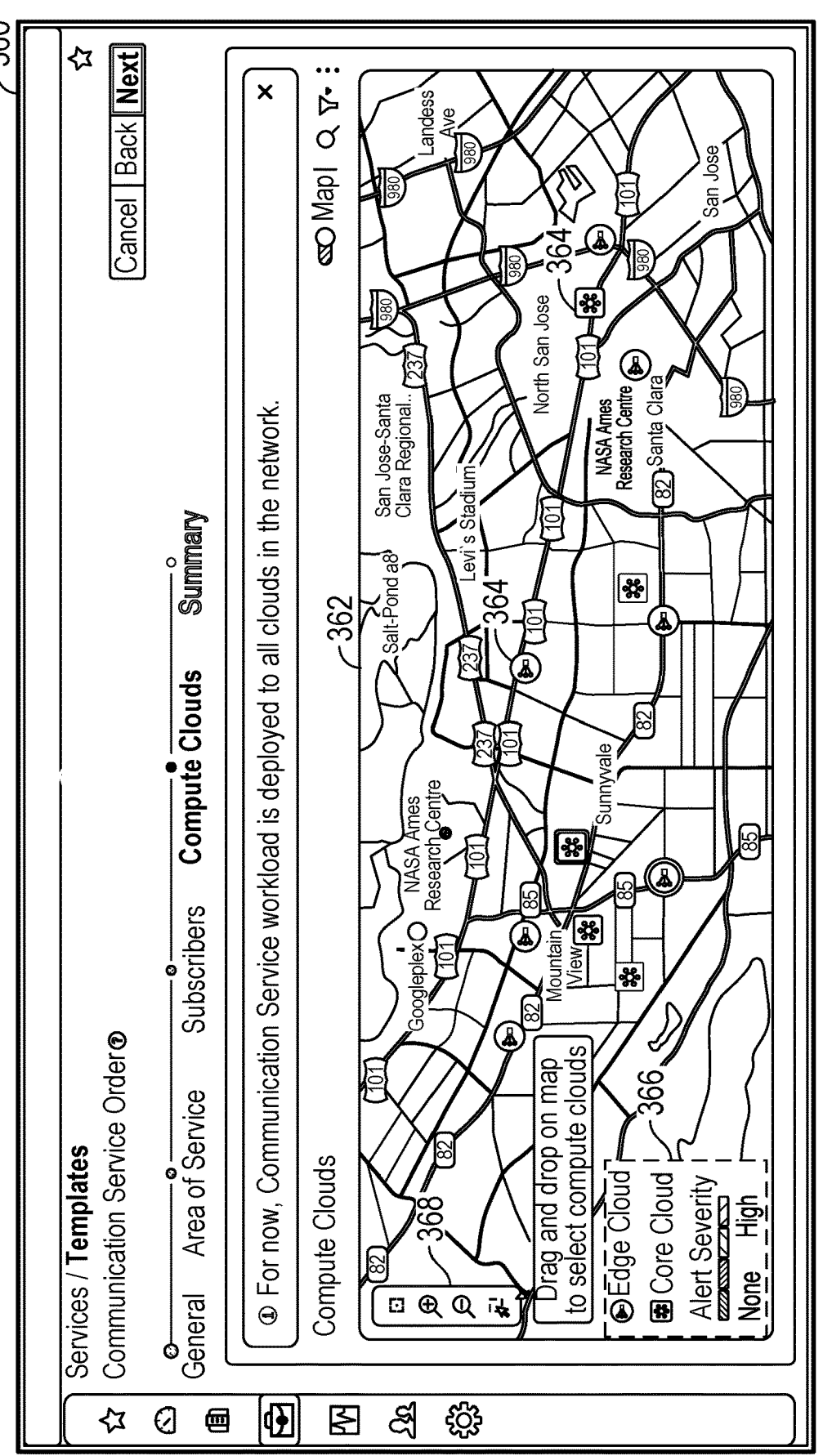

FIG. 3G is a conceptual view illustrating a compute cloud selection screen 360 for a service order, according to techniques of the disclosure. In the example illustrated in FIG. 3G, compute cloud selection screen 360 shows a map 362 illustrating icons 364 that represent compute clouds and/or data centers within a region. In some aspects, the compute clouds and/or data centers displayed on map 362 may be limited to compute clouds and/or data centers that are within the tracking areas previously selected via tracking area selection screen 340 of FIG. 3E. A user can utilize compute cloud selection screen 360 to select one or more of icons 364 representing the compute clouds and/or data centers that are to provide compute resources to execute workloads involved in providing the communication service to be provisioned. For example, workloads may include Radio Access Network (RAN) functions, core 105 functions, etc. A user can select a compute cloud based on desired characteristics of the communication service. For example, the user may select an icon 364 representing an edge cloud if low latency to the end user is desired. Further, a user may select an icon representing a core cloud to cause centralized units (CUs) to positioned near a core cloud, and may select icons representing an edge cloud to cause distributed units (DUs) to be located at an edge cloud. In some aspects, a compute cloud may have a label that indicates characteristics of the compute cloud. For example, the compute cloud may have label indicating the compute cloud is an edge compute cloud, a core compute cloud. Further, labels may indicate the processing power of the compute cloud. Other label may indicate other characteristics of a compute cloud. A mobile network operator can assign such labels to compute clouds.

Compute cloud selection screen 360 can include a legend 366 that provides information about the elements on map 362. As an example, legend 346 shows a color coded bar that can indicate an alert condition and severity associated with compute clouds shown on map 362. Compute cloud selection screen 360 also includes control menu 368 that provides user interface elements that can be used to select icons 364 within a region, zoom in or zoom out on the map, etc.

Returning to FIG. 1, in some aspects, the screens shown in FIGS. 3A-3G can be used to complete a workflow that gathers information from a user regarding a communication service to be provisioned on-demand by the mobile network operator. The information can be used to create service order 112 that can be processed by provisioning system 102 to provision the desired communication service.

Placement unit 120 can provide the information in service order 112 as input to a placement algorithm (also referred to as a homing algorithm) executed by placement unit 120 that can determine placement communication service elements (e.g., CUs and DUs) within the tracking areas and compute clouds selected by the user as described above. In some aspects, placement unit 120 places communication service elements based on labels associated with network slice elements. As an example, the placement algorithm can match attributes of the communication service specified in the service order with labels associated with infrastructure elements in the network slice template and labels of compute clouds. For instance, placement unit 120 may attempt to place a DU for a communication service whose attributed indicates low latency is required in a DU that is at an edge cloud selected by the user. Placement unit 120 may use other characteristics and attributes to determine placement of the network resources used by the communication service. For example, placement unit 120 can use labels associated with each compute cloud that may define the scope of the service (e.g., edge, regional, national). Additionally, placement unit 120 may utilize labels that specify a container runtime (e.g., Kubernetes, Openstack, etc.) to constrain placement of workloads to resources that support the specified container runtime. Further, placement unit may utilize labels that indicate that a network resource includes a smart NIC when workloads in the communication service to be deployed have characteristics indicating that a smart NIC is required (or desirable). Moreover, placement unit 120 can take affinity constraints into account. For example, placement unit may attempt to place a CU in the same cloud (or cloud provider) as a DU.

In some aspects, compute cloud selection screen 360 of FIG. 3G may be an optional part of a workflow. In such aspects, the placement algorithm of placement unit 120 can automatically include compute clouds and data centers that are within the tracking areas selected via tracking area selection screen 340 of FIG. 3E. In some aspects, a user can optionally use compute cloud selection screen 360 to provide a finer grained selection of compute clouds and/or data centers.

In some aspects, placement unit 120 can generate an estimate of costs to the user associated with the communication service to be provisioned. The estimate can be provided the user, and the user can utilize the estimate to determine whether or not to have the communication service deployed by deployment unit 122.

In some aspects, placement unit 120 can determine if there is a feasible placement for the communication service elements that are needed to provision the communication service. If there is such a feasible placement, the placement details can be provided as input to deployment unit 122, which can perform the provisioning of the communication service based on service order 112 and the placement determined by placement unit 120. If there is not a feasible placement for the communication service using the parameter and information gathered by the workflow represented by FIGS. 3A-3G, provisioning portal 104 can inform the user that the communication service cannot be deployed as specified. The user can then return to the screens of FIGS. 3A-3G to modify the parameters so that the feasibility of the communication service with respect to placement of network resources can be redetermined by placement unit 120.

In the example workflow screens shown in FIG. 3E and FIG. 3G, a map view of tracking areas and compute clouds is provided to the user. Additionally, or as an alternative, a list view of tracking areas and compute clouds may be provided.

Figure 4:
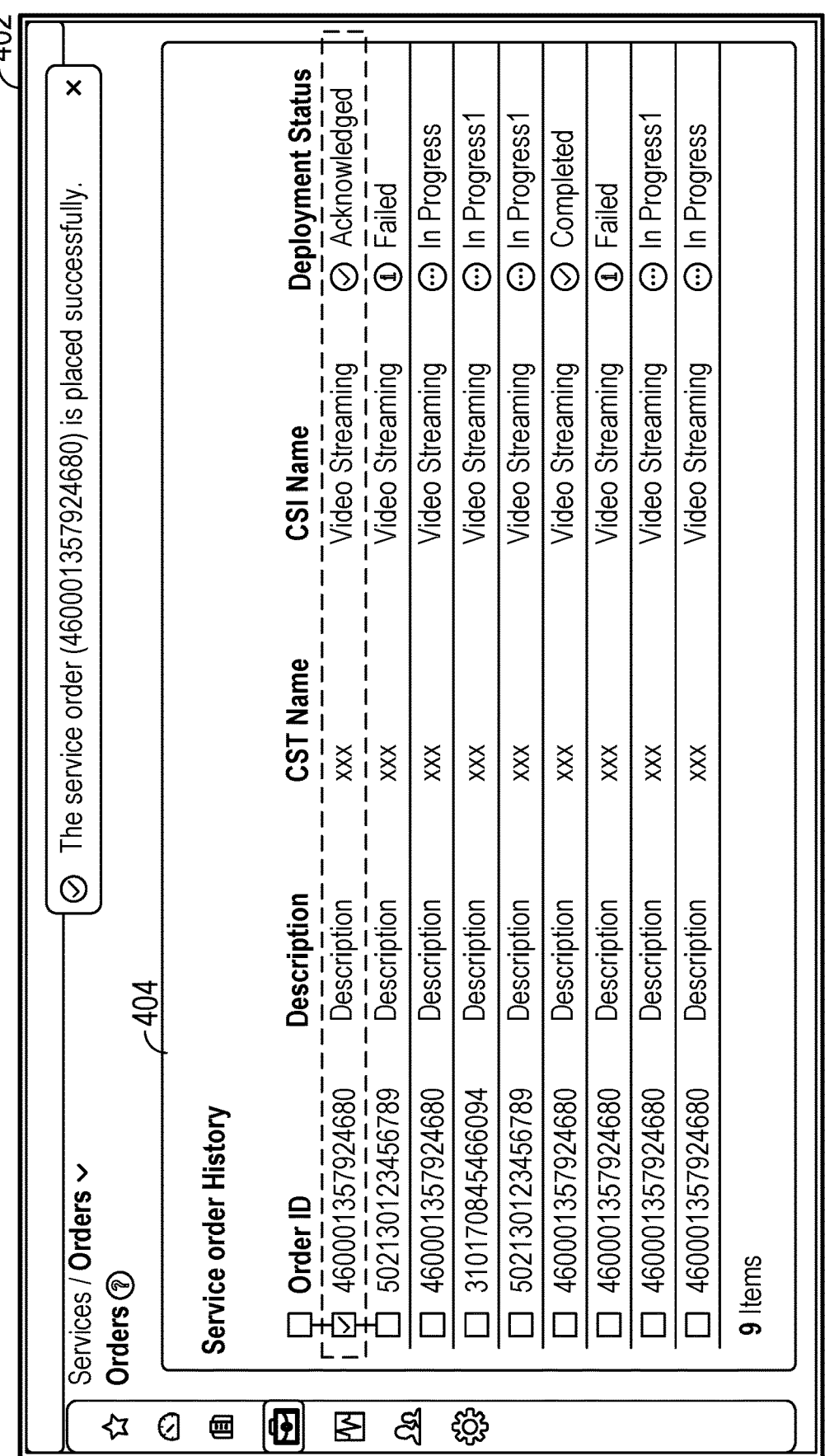
FIG. 4 is a conceptual view of a user interface screen showing service order status, according to techniques of the disclosure.

FIG. 4 is a conceptual view of a user interface screen showing a service order history, according to techniques of the disclosure. In the example illustrated in FIG. 4, service order history screen 402 includes a list 404 of service orders that have been received for processing by deployment unit 122 (FIG. 1). The history of service orders can indicate that the service order has been received but not yet processed, is currently being processed, has completed processing, or failed to be processed.

FIG. 5 is a flowchart illustrating example operations of a provisioning portal, in accordance with one or more techniques of this disclosure. A provisioning portal may receive, from a client device, a selection of a service template specifying network service attributes for a communication service (505). Next, the provisioning portal may receive a selection of one or more tracking areas (510). Next, the provisioning portal may receive a selection of one or more compute clouds and/or data centers (515). Next, the provisioning portal may generate a service order based on the network service attributes for the communication service, the one or more tracking areas, and the one or more compute clouds (520). Next, a provisioning system may provision the communication service in accordance with the service order (525).

Figure 6:
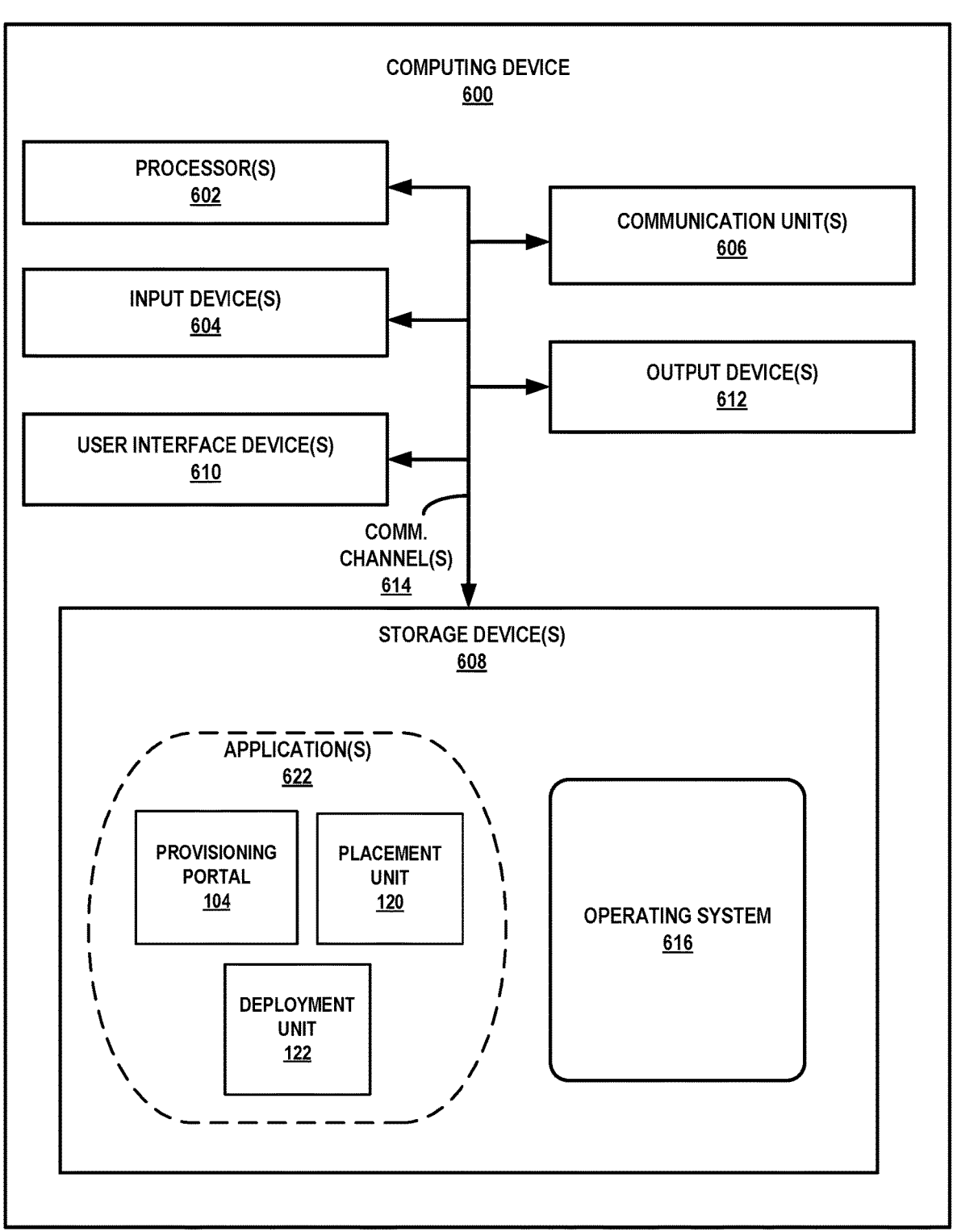
FIG. 6 is a block diagram illustrating further details of one example of a computing device that operates in accordance with one or more techniques of the present disclosure.

FIG. 6 is a block diagram illustrating further details of one example of a computing device that operates in accordance with one or more techniques of the present disclosure. FIG. 6 may illustrate a particular example of a server or other computing device 600 that includes one or more processor(s) 602 for executing any one or more of provisioning portal 104, placement unit 120, deployment unit 122 or any other system, application, node software, or module described herein. Other examples of computing device 600 may be used in other instances. Although shown in FIG. 6 as a stand-alone computing device 600 for purposes of example, a computing device may be any component or system that includes one or more processors or other suitable computing environment for executing software instructions and, for example, need not necessarily include one or more elements shown in FIG. 6 (e.g., communication units 606; and in some examples components such as storage device(s) 608 may not be co-located or in the same chassis as other components). As shown in the specific example of FIG. 6, computing device 600 includes one or more processors 602, one or more input devices 604, one or more communication units 606, one or more output devices 612, one or more storage devices 608, and user interface (UI) device 610. Computing device 600, in one example, further includes one or more applications 622 and operating system 616 that are executable by computing device 600. Each of components 602, 604, 606, 608, 610, and 612 are coupled (physically, communicatively, and/or operatively) for inter-component communications. In some examples, communication channels 614 may include a system bus, a network connection, an inter-process communication data structure, a message bus, or any other method for communicating data. As one example, components 602, 604, 606, 608, 610, and 612 may be coupled by one or more communication channels 614.

Processors 602, in one example, are configured to implement functionality and/or process instructions for execution within computing device 600. For example, processors 602 may be processing circuitry capable of processing instructions stored in storage device 608. Examples of processors 602 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 608 may be configured to store information within computing device 600 during operation. Storage device 608, in some examples, is described as a computer-readable storage medium. In some examples, storage device 608 is a temporary memory, meaning that a primary purpose of storage device 608 is not long-term storage. Storage device 608, in some examples, is described as a volatile memory, meaning that storage device 608 does not maintain stored contents when the computer is turned off. Examples of volatile memories include random access memories (RAM), dynamic random access memories (DRAM), static random access memories (SRAM), and other forms of volatile memories known in the art. In some examples, storage device 608 is used to store program instructions for execution by processors 602. Storage device 608, in one example, is used by software or applications running on computing device 600 to temporarily store information during program execution.

Storage devices 608, in some examples, also include one or more computer-readable storage media. Storage devices 608 may be configured to store larger amounts of information than volatile memory. Storage devices 608 may further be configured for long-term storage of information. In some examples, storage devices 608 include non-volatile storage elements. Examples of such non-volatile storage elements include magnetic hard discs, optical discs, floppy discs, flash memories, or forms of electrically programmable memories (EPROM) or electrically erasable and programmable (EE-PROM) memories.

Computing device 600, in some examples, also includes one or more communication units 606. Computing device 600, in one example, utilizes communication units 606 to communicate with external devices via one or more networks, such as one or more wired/wireless/mobile networks. Communication units 606 may include a network interface card, such as an Ethernet card, an optical transceiver, a radio frequency transceiver, or any other type of device that can send and receive information. In some examples, computing device 600 uses communication unit 606 to communicate with an external device.

Computing device 600, in one example, also includes one or more user interface devices 610. User interface devices 610, in some examples, are configured to receive input from a user through tactile, audio, or video feedback. Examples of user interface devices(s) 610 include a presence-sensitive display, a mouse, a keyboard, a voice responsive system, video camera, microphone, or any other type of device for detecting a command from a user. In some examples, a presence-sensitive display includes a touch-sensitive screen.

One or more output devices 612 may also be included in computing device 600. Output device 612, in some examples, is configured to provide output to a user using tactile, audio, or video stimuli. Output device 612, in one example, includes a presence-sensitive display, a sound card, a video graphics adapter card, or any other type of device for converting a signal into an appropriate form understandable to humans or machines. Additional examples of output device 612 include a speaker, a cathode ray tube (CRT) monitor, a liquid crystal display (LCD), or any other type of device that can generate intelligible output to a user.

Computing device 600 may include operating system 616. Operating system 616, in some examples, controls the operation of components of computing device 600. For example, operating system 616, in one example, facilitates the communication of one or more applications 622, access network intelligent controller 102 and/or access network agents 624 with processors 602, communication unit 606, storage device 608, input device 604, user interface devices 610, and output device 612.

Application 622 may also include program instructions and/or data that are executable by computing device 600. Example applications 622 executable by computing device 600 may include application and/or other software to implement capabilities described above. For example, applications 622 can include applications associated with provisioning portal 104, placement unit 120, and deployment unit 122.

Figure 7A:
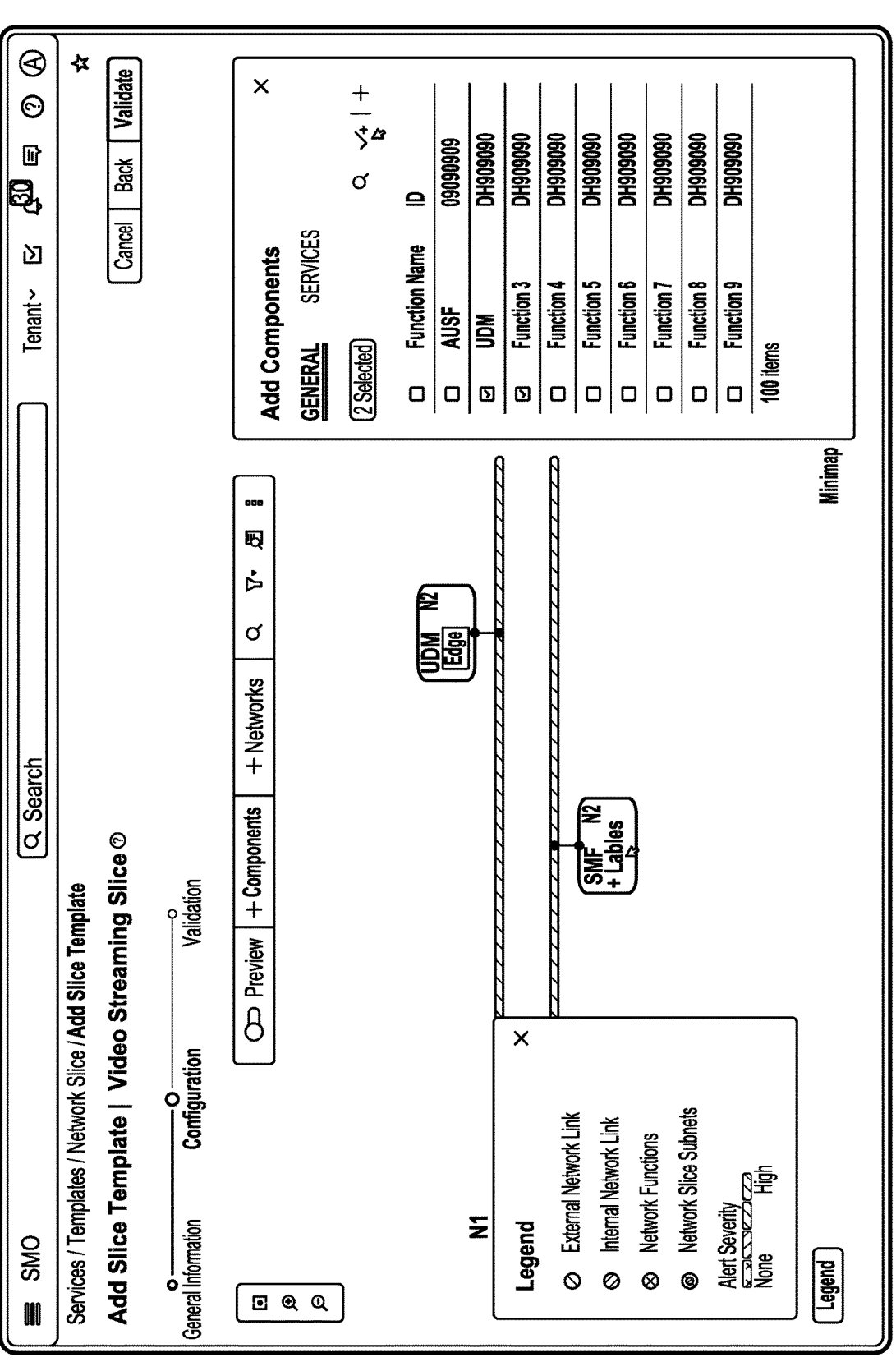
FIGS. 7A-7B are conceptual views of a user interface screen for provisioning a network service, according to techniques of the disclosure.
Figure 7B:
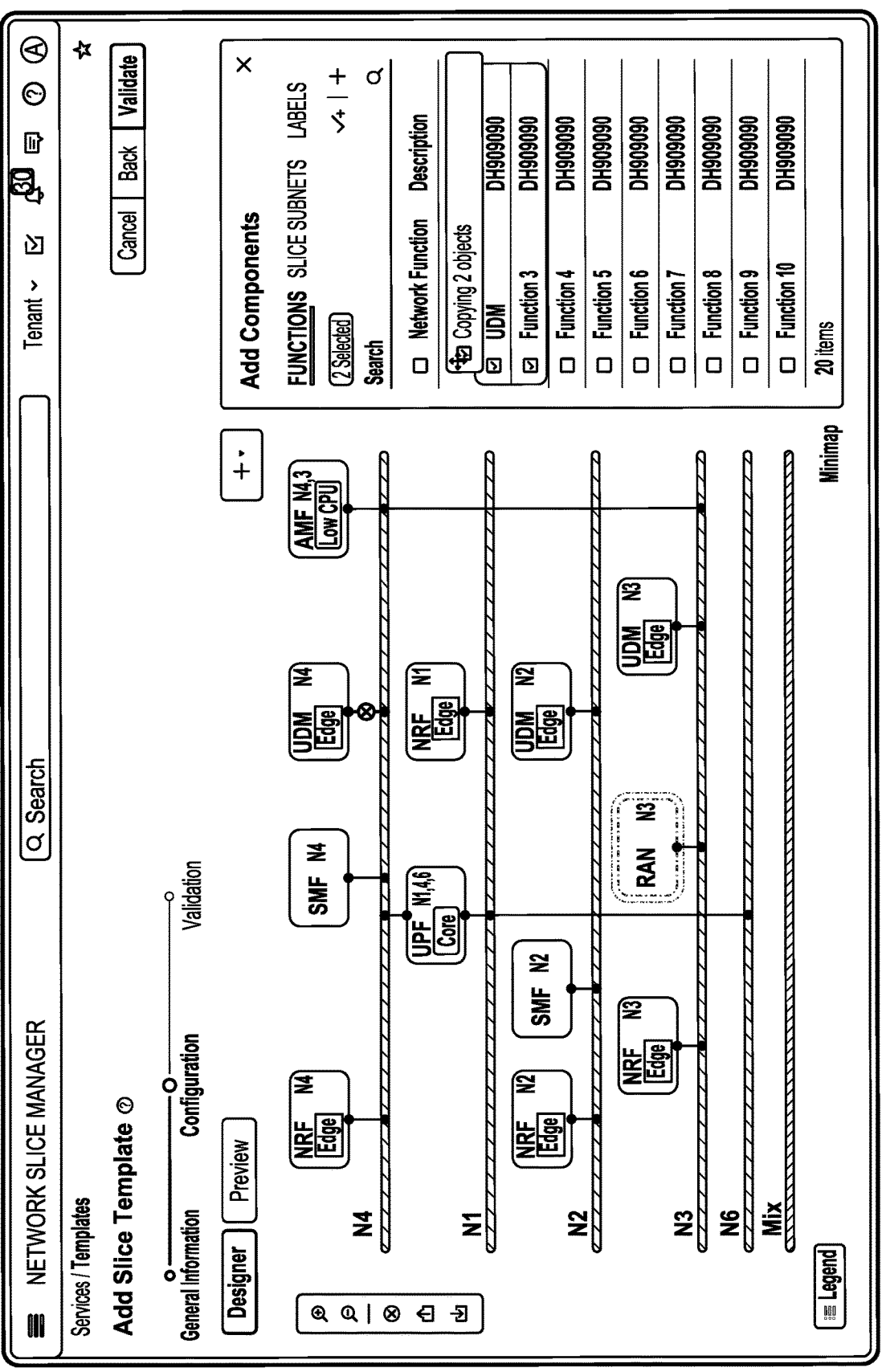

FIGS. 7A-7B are conceptual views of a user interface screen for provisioning a network service, according to techniques of the disclosure. In some examples, the user interface screens of FIGS. 7A-7B may be presented by UI 106 of FIG. 1.

Network templates or blueprints are the basic building blocks of network slices for services like private 5G mobile, augmented reality (AR), virtual reality (VR), cloud gaming, massive Internet of Things (MIoT), etc. These templates include the necessary information like constituent network function descriptors (NFDs), network slice subnet templates (NSSTs), network links, configuration, SLA attributes, etc. These slice/slice-subnet templates, along with Global System for Mobile Communications Association (GSMA) Generic Network Slice Template (GST) or Network Slice Type (NEST) attributes, are used to deploy network slices. Designing network templates or blueprints may become complicated due to the need to handle multiple components, network configurations, and interconnection links. With the onset of 5G and NFV (Network Function Virtualization), there has been a long-standing need in the Telco community for a powerful design studio that provides a capability of designing arbitrary and meaningful network blueprints with topology and feasibility assistance. Other systems may use different visual styles and do not provide drag-and-drop functionality. Such other systems do not support cloud affinity labels for homing and placement for network functions. Additionally, other systems do not have a real-time feedback loop validating the topology and feasibility of a designed template.

In accordance with the techniques of the disclosure, devices, systems, and methods are described that provide a user with the capability to design and manage slice templates or blueprints in an interactive and visual design studio. The system disclosed herein provides a user interface that enables a user to design numerous templates, including:

Domain-level Network Slice Subnet Template (NSST). A Domain-level NSST is a group of one or more network function descriptors or NSSTs interconnected in a complex topology for a domain-specific service.

Root-level Network Slice Subnet Template (or end to end Network Slice Template). A Root-level NSST is a group of NSSTs (RAN, Core, Transport Network (TN)) connected to provide an end-to-end service.

The system described herein provides a user interface enables a user to design arbitrary and meaningful network blueprints with topology and feasibility assistance. In some examples, the system as described herein may provide drag-and-drop functionality for designing NSSTs. Additionally, the system described herein may cloud affinity labels for homing and placement for network functions. In some examples, the system described herein may provide a real-time feedback loop validating the topology and feasibility of a designed template.

FIG. 7A is a conceptual view of a user interface screen for adding a slice template for use in provisioning a network service, according to techniques of the disclosure. In some examples, the user interface screen of FIG. 7A may be presented by UI 106 of FIG. 1. The example of FIG. 7A depicts an example wherein a user adds a slice template for a video streaming slice. As depicted in FIG. 7A, a user may select one or more components for use within the N1 interface of the slice defined by the slice template. In some examples, the user interface of FIG. 7A may enable a user to add components from multiple lists of components, including a "general" list and a "services" list.

FIG. 7B is a conceptual view of a user interface screen for adding a slice template for use in provisioning a network service, according to techniques of the disclosure. In some examples, the user interface screen of FIG. 7B may be presented by UI 106 of FIG. 1. As depicted in FIG. 7B, a user may select one or more components for use within each of the N4, N1, N2, N3, N6, and Mix interfaces of the slice defined by the slice template. In some examples, the user interface of FIG. 7B may enable a user to add components from multiple lists of components, include a "functions" list, a "slice subnets" list, and a "labels" list.

Figure 8:
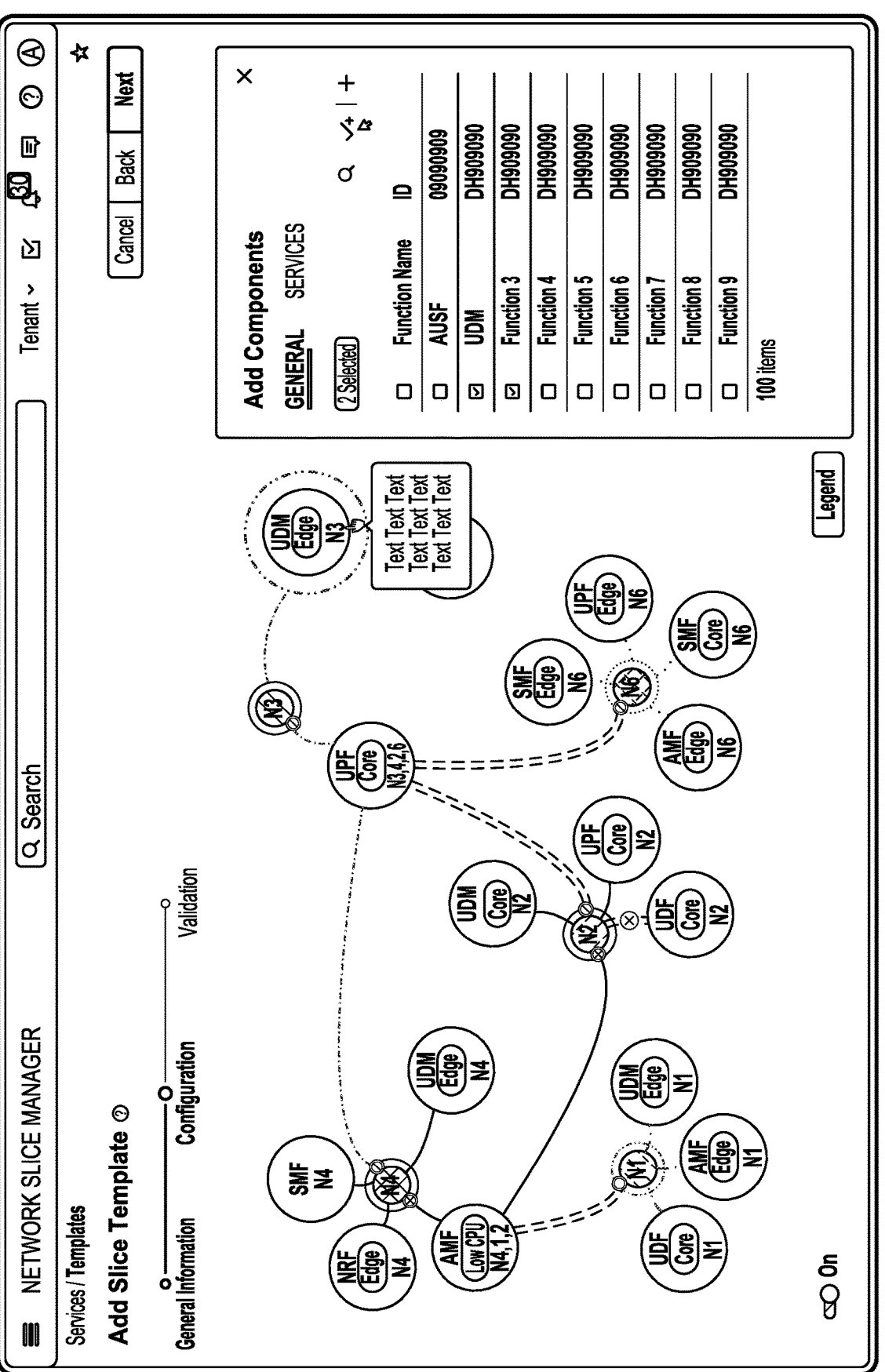
FIG. 8 is a conceptual view of a user interface screen for provisioning a network service, according to techniques of the disclosure.

FIG. 8 is a conceptual view of a user interface screen for provisioning a network service, according to techniques of the disclosure. Specifically, FIG. 8 depicts a conceptual view of a user interface screen for adding a slice template for use in provisioning a network service, according to techniques of the disclosure. In some examples, the user interface screen of FIG. 8 may be presented by UI 106 of FIG. 1. As depicted in FIG. 7B, a user may select one or more components for use within each of the N1, N2, N3, N4, and N6 interfaces of the slice defined by the slice template. In some examples, the user interface of FIG. 8 may enable a user to add components from multiple lists of components, including a "general" list and a "services" list.

Figure 9A:
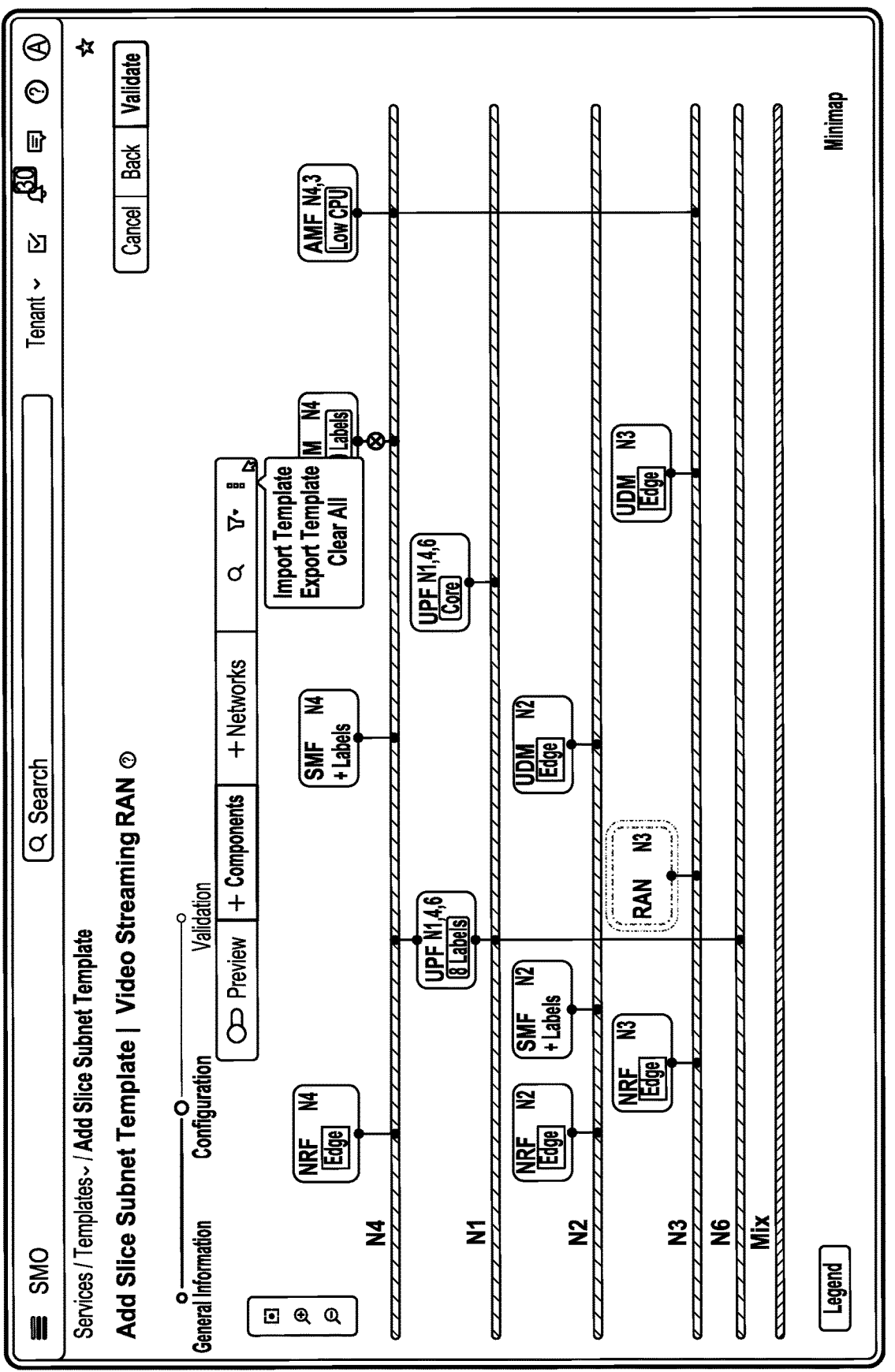
FIGS. 9A-9B are conceptual views of a user interface screen for provisioning a network service, according to techniques of the disclosure.
Figure 9B:
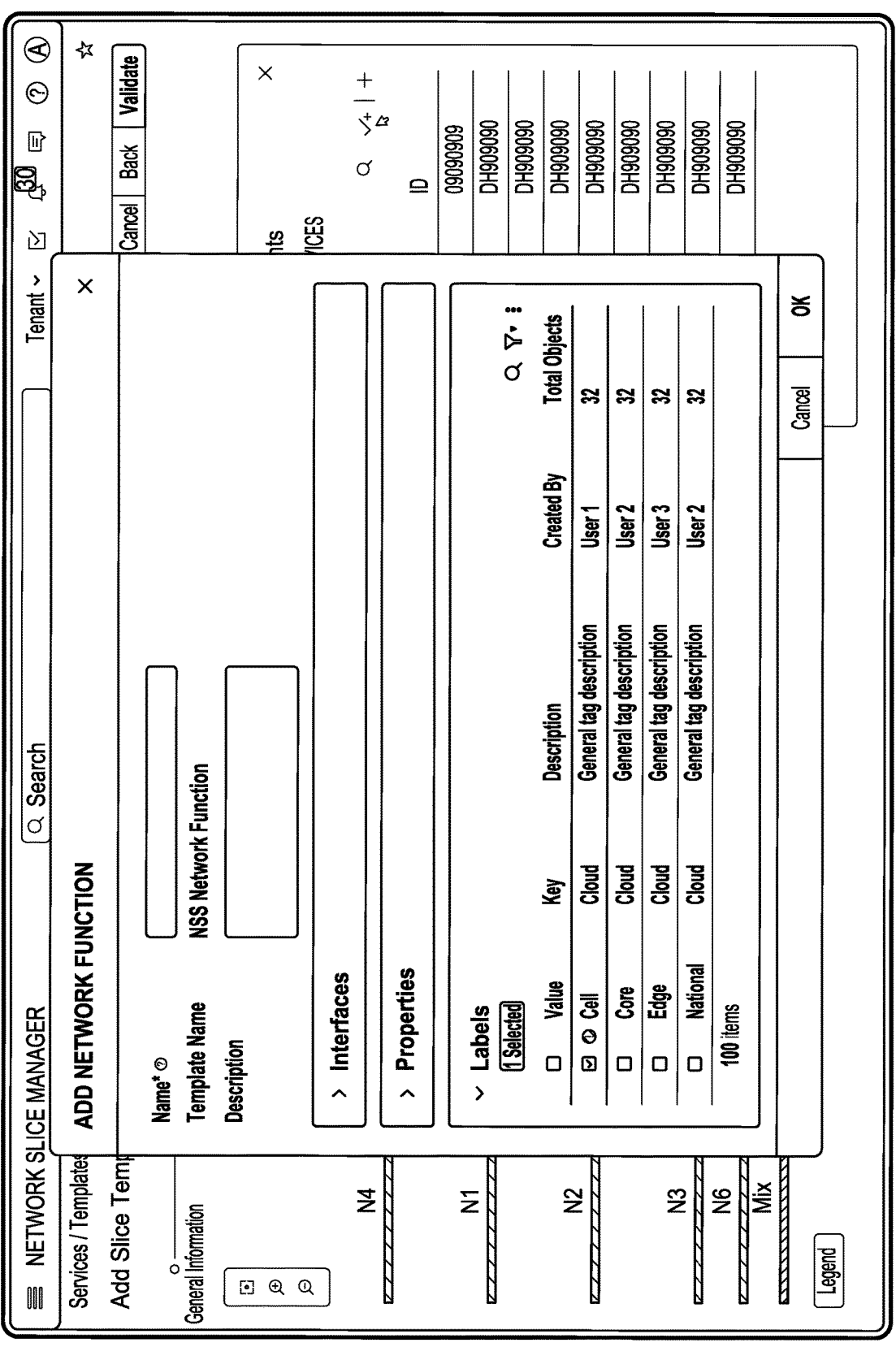

FIGS. 9A-9B are conceptual views of a user interface screen for provisioning a network service, according to techniques of the disclosure. In some examples, the user interface screen of FIGS. 9A-9B may be presented by UI 106 of FIG. 1.

The user interface described herein provides a design studio that enables administrators with a simple and streamlined solution to design and configure intent-based slice templates in complex topologies. Using this studio, administrators may combine, connect, and configure network functions, slice subnets, and network links.

As described herein, an administrator may use the design studio provided by UI 106 to create domain-specific slice-subnet templates by importing and interconnecting NFDs and/or other slice-subnet templates using network links (with or without slicing support). For example, an administrator may use the design studio provided by UI 106 to create end-to-end slice templates by importing and interconnecting domain-specific slice-subnet templates (with or without slicing support).

In some examples, the design studio provided by UI 106 may provide a user interface that allows a user to import of virtualized network functions (VNFs), cloud-native network functions (CNFs) (sometimes referred to as containerized network functions), and physical network functions (PNFs) from network function descriptor inventory and pre-designed slice-subnet templates from template inventory. In some examples, the design studio provided by UI 106 may provide a user interface that allows a user to configure network links to interconnect network functions and/or slice-subnet templates. In some examples, the design studio provided by UI 106 may provide a user interface that allows a user to add cloud affinity labels to network functions for homing and placement during deployment. In some examples, the design studio provided by UI 106 may provide a user interface that allows a user to add individual networks and connecting network functions to them using interfaces. In some examples, the design studio provided by UI 106 may provide a user interface that allows a user to zoom in or out. Furthermore, the design studio may provide a "mini-map" capability that illustrates the design as a whole while enabling a user to focus on a particular part of the design.

FIG. 9A is a conceptual view of a user interface screen for adding a slice subnet template for use in provisioning a network service, according to techniques of the disclosure. The example of FIG. 9A depicts an example of a slice subnet template for a Video Streaming RAN service. As depicted in FIG. 9A, a user may import, export, or clear one or more templates. Additionally, a user may select one or more components for use within each of the N4, N1, N2, N3, N6, and Mix interfaces of the slice subnet defined by the slice subnet template.

FIG. 9B is a conceptual view of a user interface screen for adding a network function to a slice subnet template for use in provisioning a network service, according to techniques of the disclosure. As depicted in FIG. 9B, a user may add a network function to the slice subnet template of FIG. 9A. The user interface of FIG. 9B may enable a user to define one or more interfaces, properties, or labels for the network function.

In other example, the techniques of the disclosure enable a user interface screen for adding a slice template for a Video Streaming slice. In this example, a user may select one or more components for use within each of the N4, N1, N2, N3, N6, and Mix interfaces of the slice defined by the slice template.

In some examples, the techniques of the disclosure provide a user interface screen for testing or validating a slice template for use in provisioning a network service. After a user provides general information and configuration for a slice template, the user interface may test or validate the configuration before allowing the user to deploy a slice according to the slice template. In some examples, the user interface may provide the user with a list of errors or warnings based on the outcome of the slice template validation.

FIGS. 10A-10F are conceptual views of a user interface screen for provisioning a network service, according to techniques of the disclosure. In some examples, the user interface screens of FIGS. 10A-10F may be presented by UI 106 of FIG. 1.

Figure 10A:
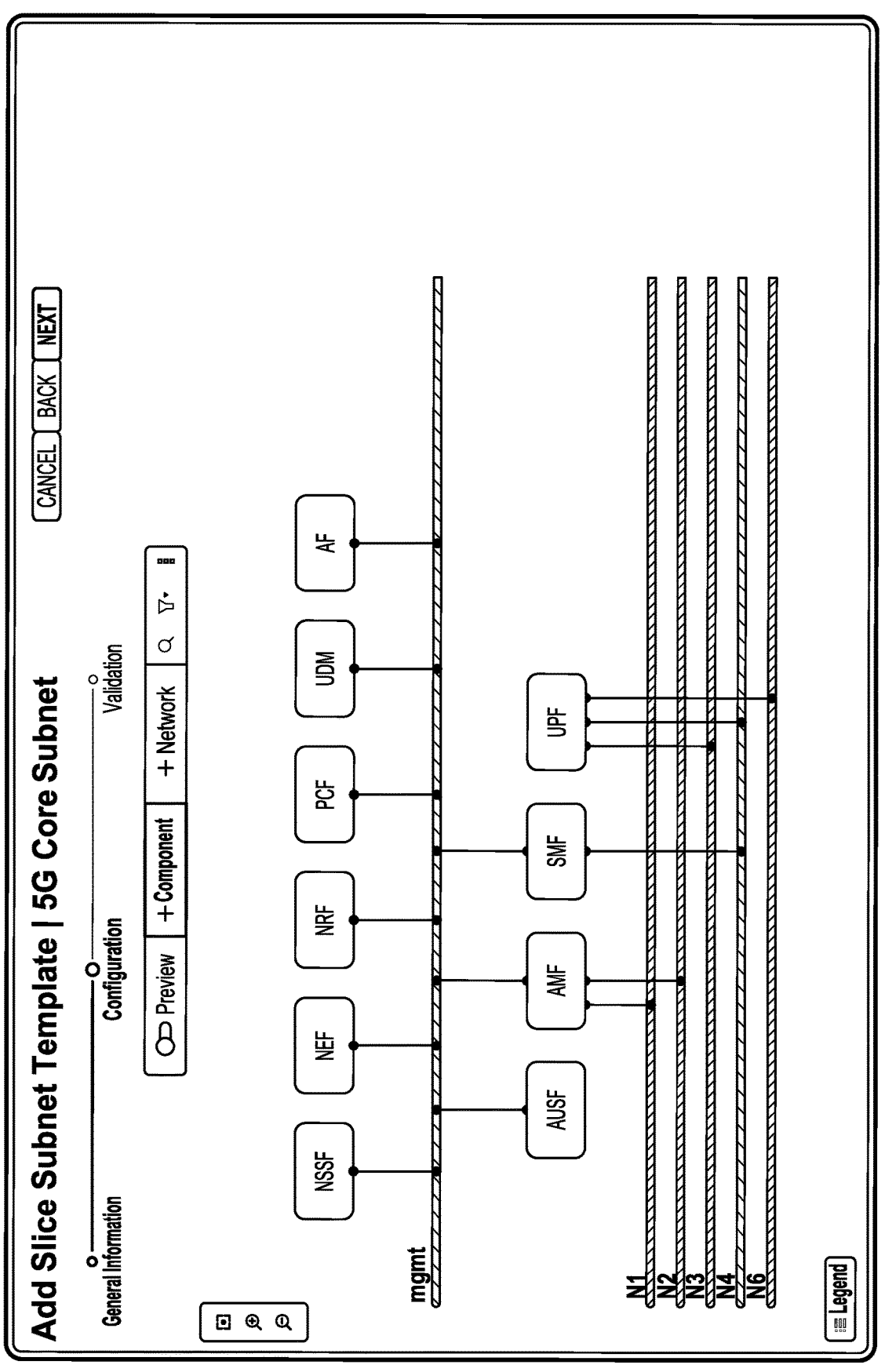
FIGS. 10A-10F are conceptual views of a user interface screen for provisioning a network service, according to techniques of the disclosure.
Figure 10B:
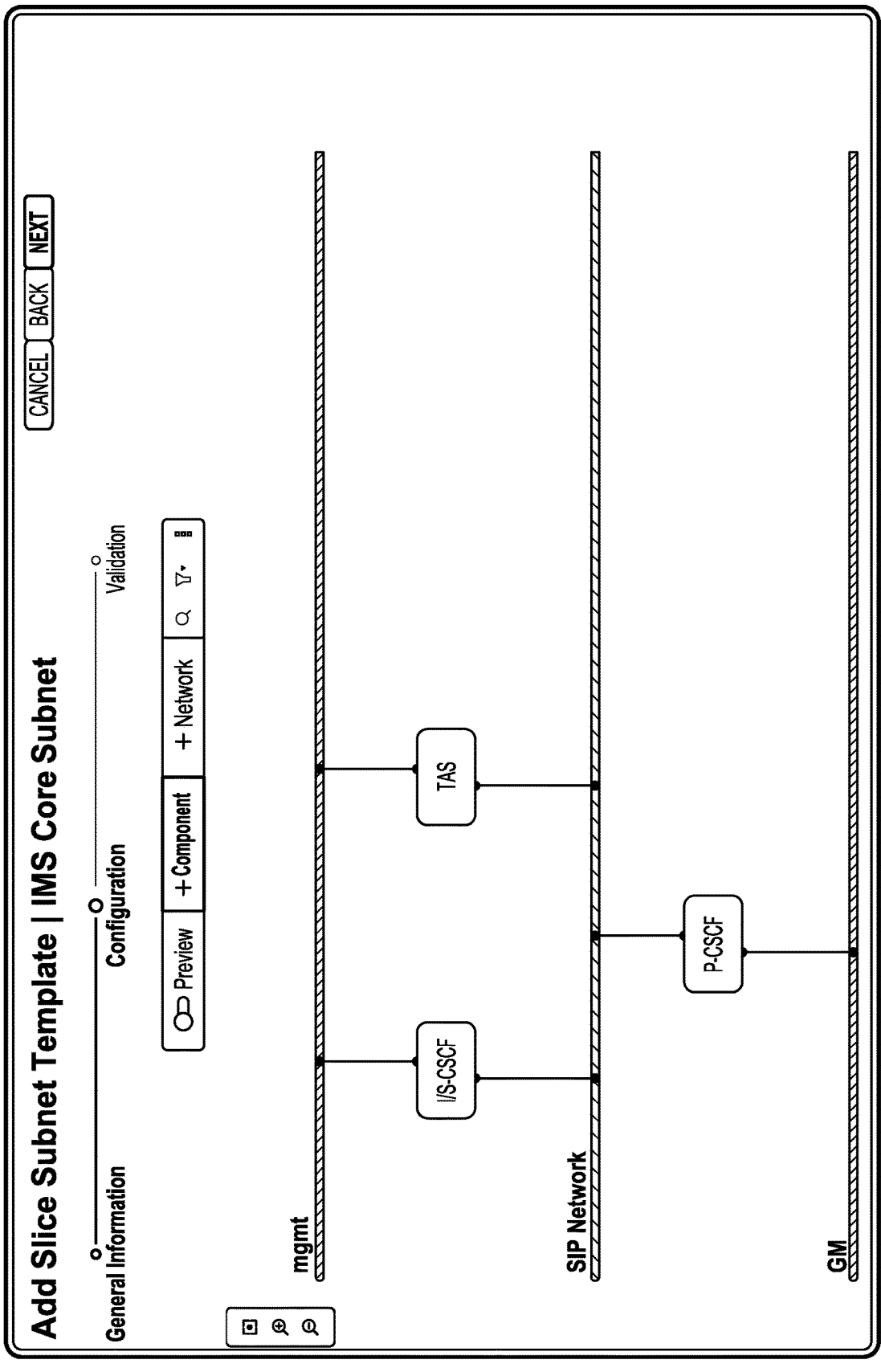
Figure 10C:
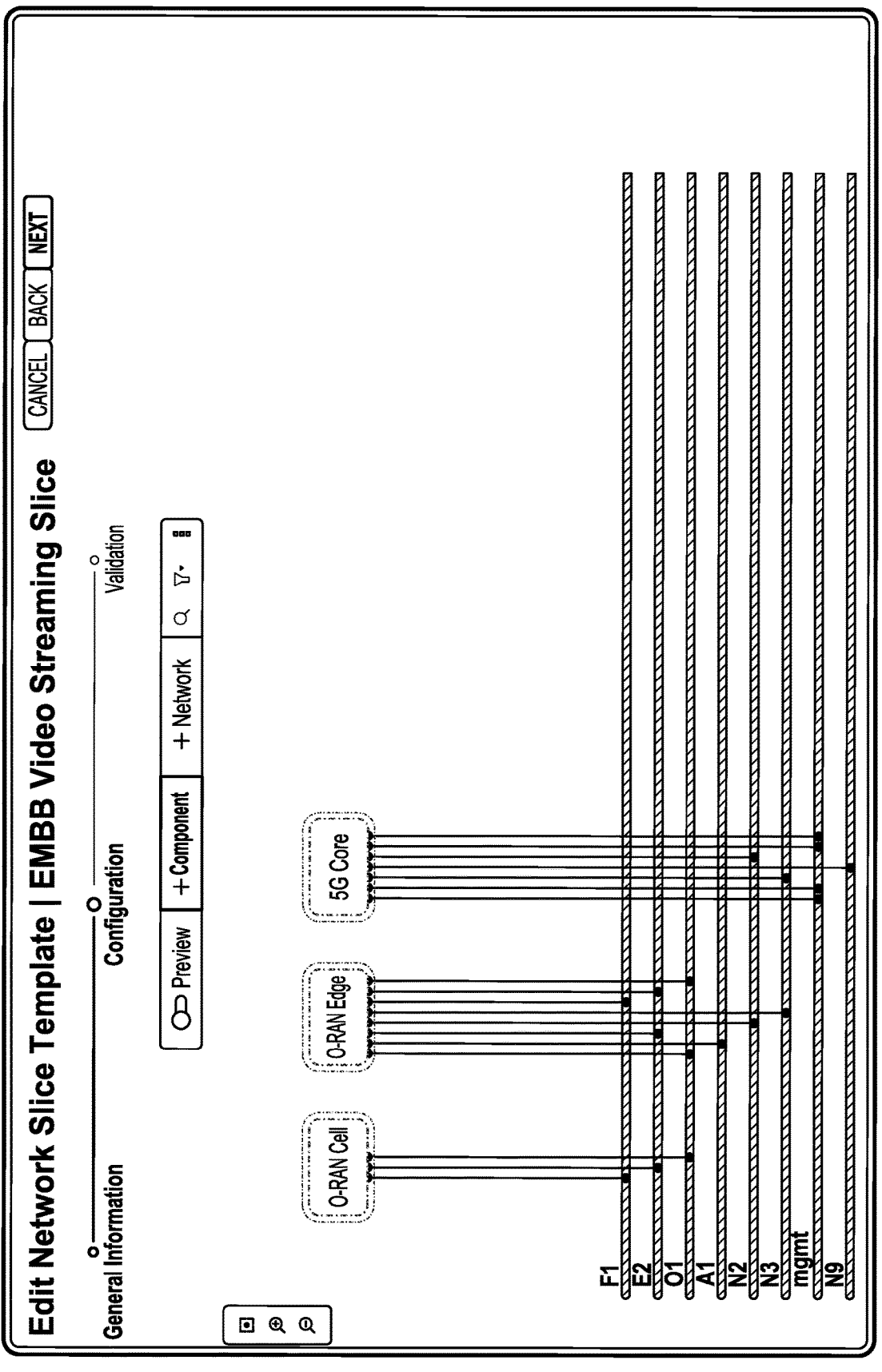

In some examples, the user interface of FIGS. 10A-10C enables a user to design a multi-domain slice or slice subnet. In some examples, UI 106 provides a design studio that enables users to design slice templates or slice subnet templates of multiple domains, such as RAN, Core, Transport Network, Value-Added Services (e.g., IP Multimedia Subsystem (IMS)), etc. The user interface of FIGS. 10A-10C depict examples of domain-specific slice subnets that may be designed as described herein.

In some examples, the techniques of the disclosure enable a user interface screen for adding a slice subnet template for use in provisioning a network service. Specifically, such a user interface may depict a template for a RAN slice subnet that includes Open RAN (O-RAN) network functions and Near-Real-Time RAN Intelligent Controller (Near-RT MC).

FIG. 10A is a conceptual view of a user interface screen for adding a slice subnet template for use in provisioning a network service, according to techniques of the disclosure. The example of FIG. 10A depicts an example of a slice subnet template for a 5G Core slice subnet that includes 5G core network functions. In some examples, the user interface described herein enables a user to design a full 5G Core Slice Subnet. As depicted in FIG. 10A, the design studio provided by UI 106 enables a user to design a 5G Core slice subnet (1-level) by importing one or more network functions.

FIG. 10B is a conceptual view of a user interface screen for adding a slice subnet template for use in provisioning a network service, according to techniques of the disclosure. The example of FIG. 10B depicts an example of a value-added service slice subnet template for an IMS Core subnet.

FIG. 10C is a conceptual view of a user interface screen for editing a network slice template, according to techniques of the disclosure. The example of FIG. 10C depicts an example of a network slice template for an eMBB Video Streaming network slice. As depicted in the example of FIG. 10C, a user may design, via UI 106, a slice template by connecting domain-specific slice subnets all the way from RAN to Core to IMS to provide an end-to-end service.

Figure 10D:
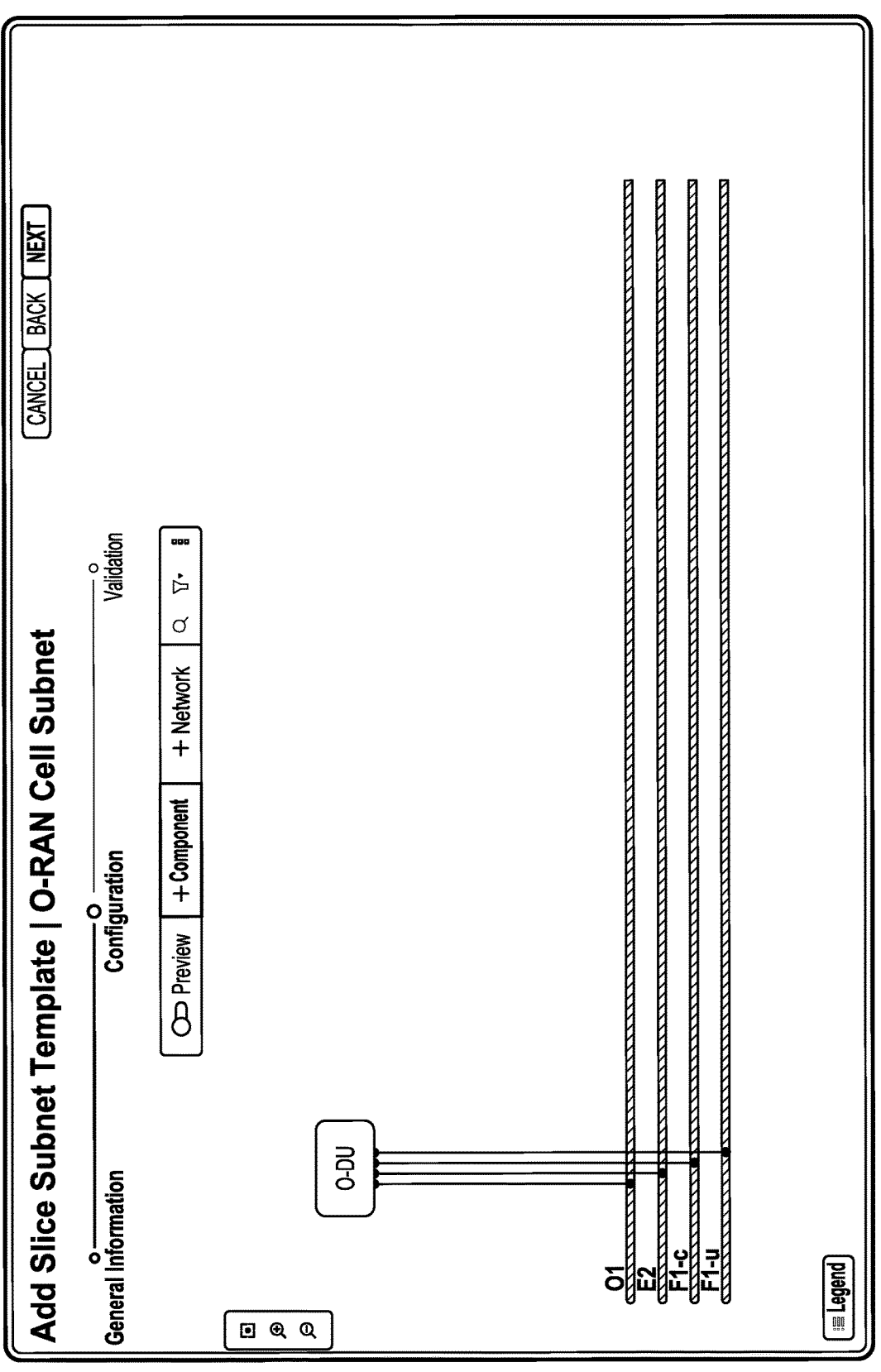
Figure 10E:
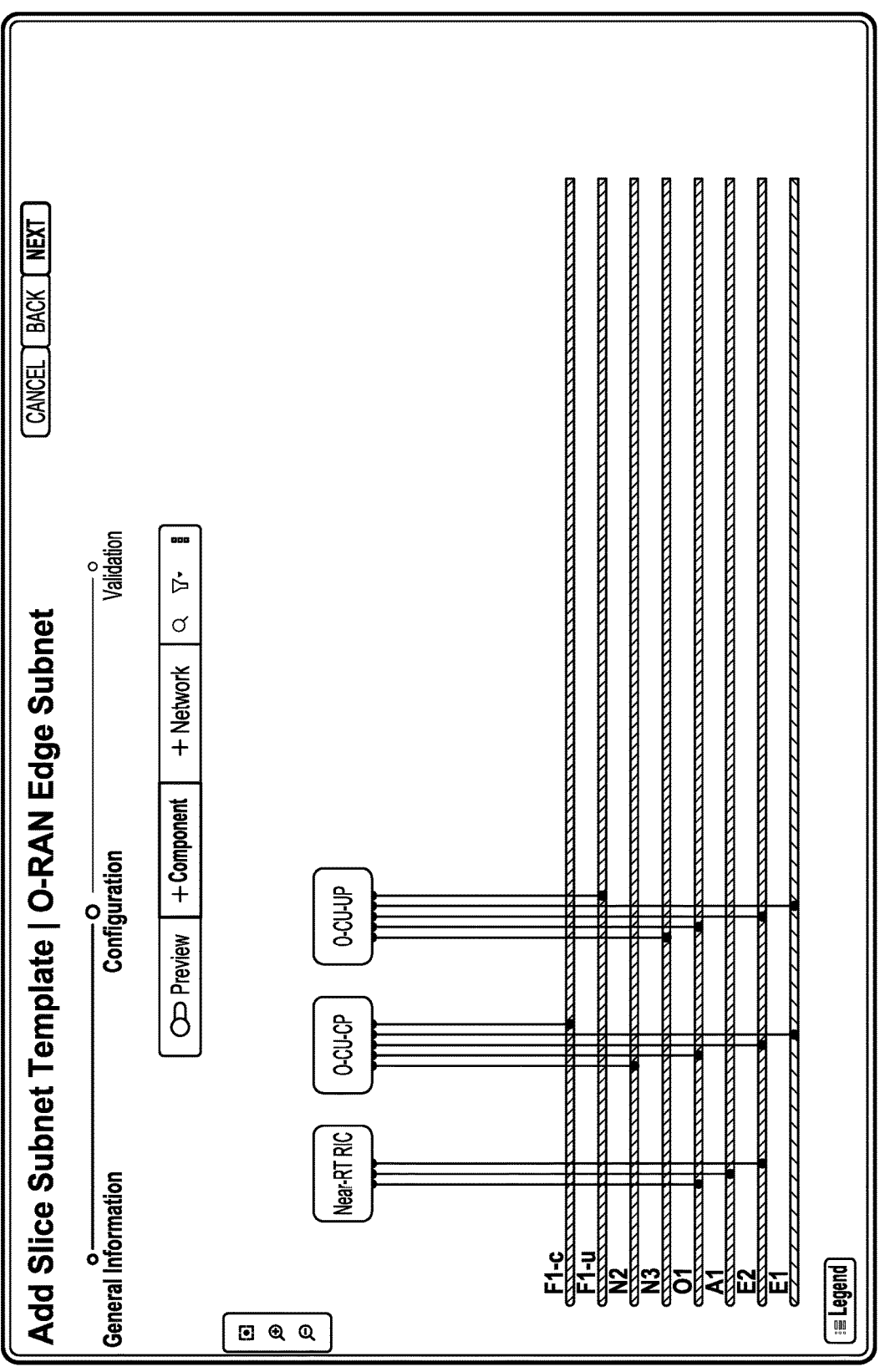
Figure 10F:
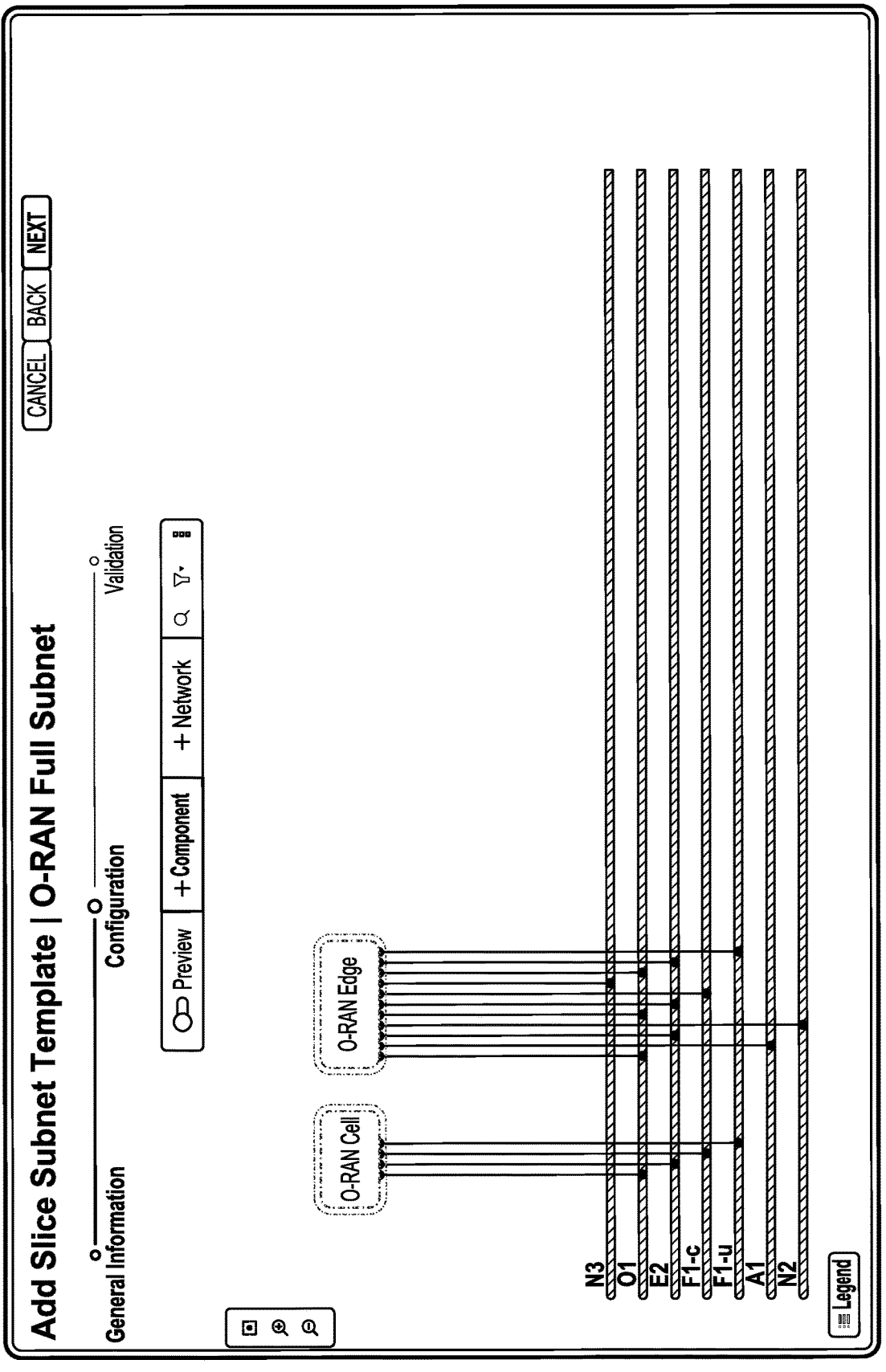

In some examples, the user interface of FIGS. 10D-10F enables a user to design a multi-level slice or slice subnet. In some examples, the design studio provided by UI 106 enables a user to create hierarchical templates by importing slice subnets within slice subnets. In some examples, a user may design a full O-RAN slice subnet. For example, the user may design, via UI 106, an O-RAN slice subnet (1-level) by importing one or more network functions.

FIG. 10D is a conceptual view of a user interface screen for adding a slice subnet template for use in provisioning a network service, according to techniques of the disclosure. The example of FIG. 10D depicts an example of a slice subnet template for an O-RAN cell slice subnet. FIG. 10D depicts an example of a hierarchical O-RAN Slice Subnet. For example, instead of importing all the network functions in one template, the user interface of FIG. 10D may enable a user to disaggregate O-RAN network functions into multiple slice subnet templates for enabling sharing, template reusability, etc.

FIG. 10E is a conceptual view of a user interface screen for adding a slice subnet template for use in provisioning a network service, according to techniques of the disclosure. The example of FIG. 10E depicts an example of a slice subnet template for an O-RAN edge slice subnet.

FIG. 10F is a conceptual view of a user interface screen for adding a slice subnet template for use in provisioning a network service, according to techniques of the disclosure. The example of FIG. 10F depicts an example of a slice subnet template for an O-RAN full slice subnet. In some examples, a user may design, via UI 106, an O-RAN full slice subnet (2-level subnet) by importing the slice subnets as defined by the slice subnet templates of FIGS. 10D and 10E above.

In some examples, the user interface described herein enables a user to design a hierarchical 5G Core slice subnet. Instead of importing all the network functions in one template, the design studio provided by UI 106 enables a user to disaggregate 5G core network functions into multiple slice subnet templates for enabling sharing, template reusability, etc. For example, the techniques of the disclosure may enable a user interface for adding a slice subnet template for use in provisioning a network service. For example, a 5G core data-plane slice subnet includes data-plane network functions in 5G Core. A 5G core management-plane slice subnet includes management-plane network functions in 5G Core. A 5G core complete slice subnet (2-level slice subnet). In some examples, a user may design, via UI 106, the 5G core complete slice subnet by importing the slice subnets defined by the 5G core data-plane slice subnet and the 5G core management-plane slice subnet of this example.

Figure 11A:
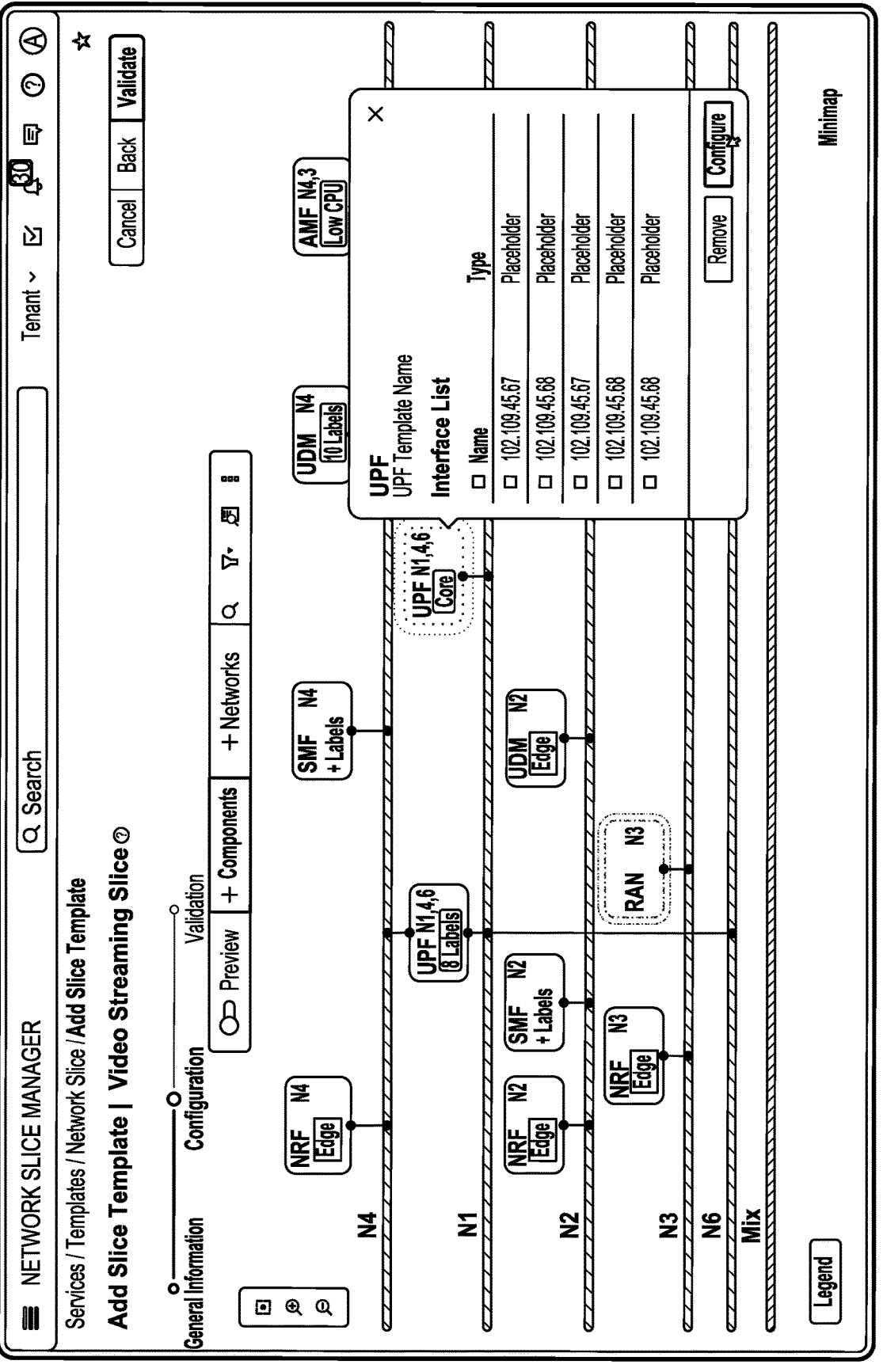
FIGS. 11A-11C are conceptual views of a user interface screen for provisioning a network service, according to techniques of the disclosure.
Figure 11B:
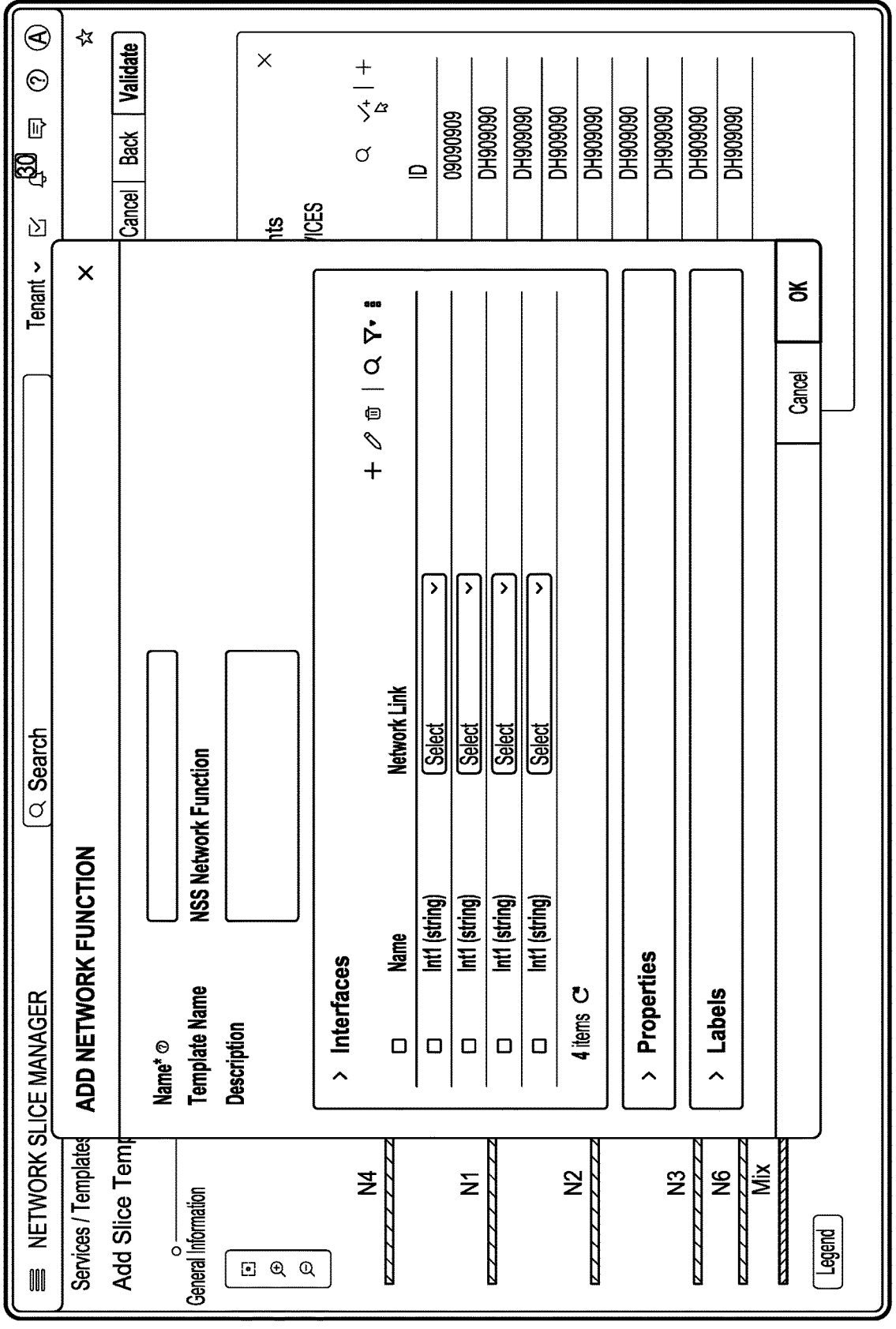
Figure 11C:
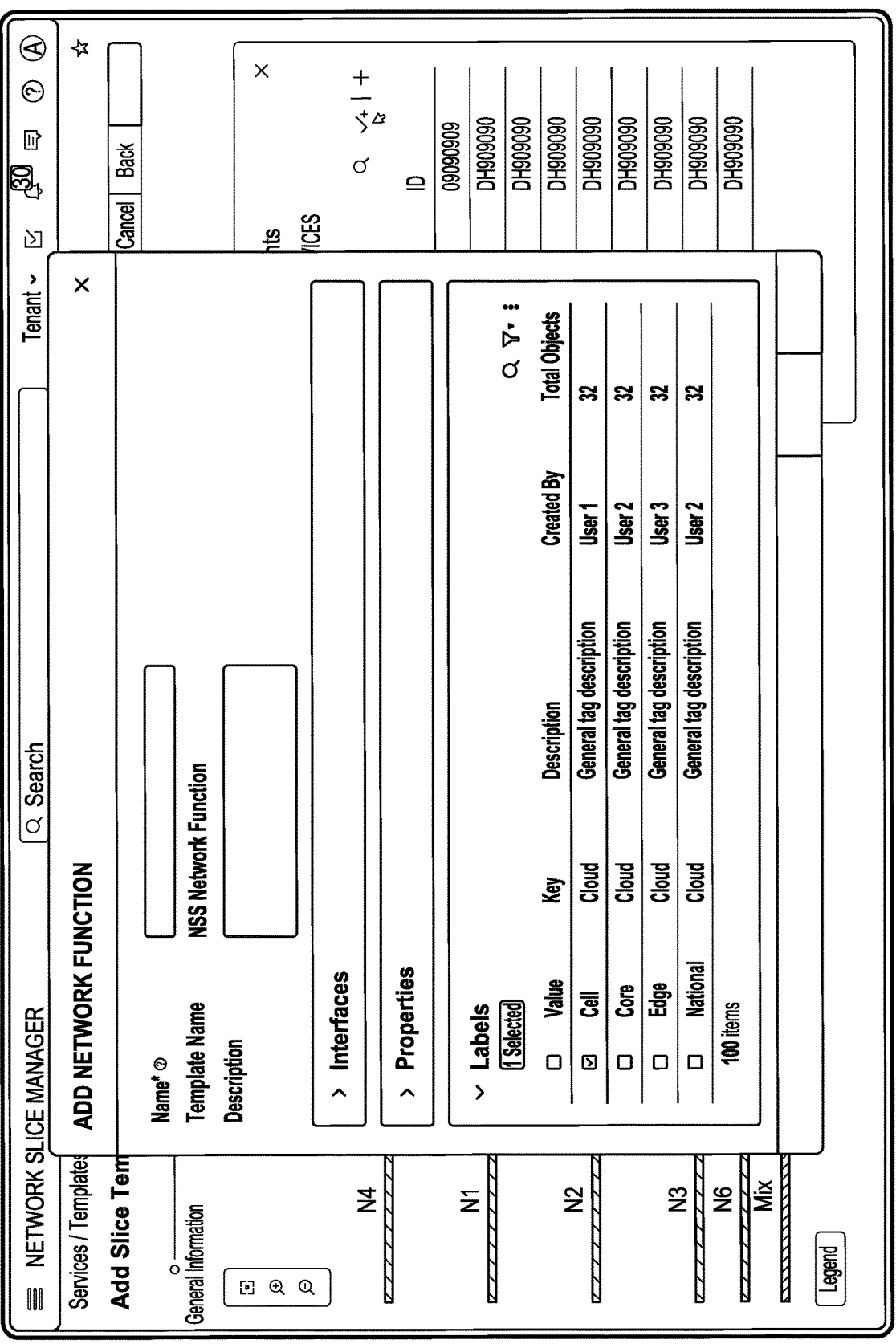

FIGS. 11A-11C are conceptual views of a user interface screen for provisioning a network service, according to techniques of the disclosure. In some examples, the user interface screens of FIGS. 11A-11C may be presented by UI 106 of FIG. 1.

In some examples, the user interface depicted by FIGS. 11A-11C may enable homing and placement of network functions on massive-scale heterogeneous infrastructure. For example, in a telecommunications environment, depending upon the coverage of the network, there may be 10,000s to 100,000s of clouds that host slice workloads. Each of these clouds may have its own properties, such as domain (e.g., cell, edge, regional, national, etc.), location, capacity (e.g., compute, memory, storage, etc.) or other properties not expressly described herein. During orchestration of the slice, an administrator may deploy network functions to these clouds to provide services. Providing a placement logic to these network functions may become a complex task due to the massive scale and heterogeneity of the infrastructure.

The design studio provided by UI 106 described herein may provide a simple way for users to add placement logic by enabling users to add labels to network functions. In some examples, the labels follow "name: value" semantics, such as "Cloud-Domain:Edge," "Cloud-Domain:National," "Location: CA," or "Location: NYC."

Additionally, the user may attach attributes, such as cloud affinity or anti-affinity, to the network functions using the labels provided by UI 106. The user may attach these labels to the network functions during design time, and provisioning system 102 may parse the labels during orchestration for placement of these network functions.

In some examples, the user may import CNF descriptors (CNFDs) or PNF descriptors (PNFDs) in a Network Function (NF) Catalog. Each NF in the NF catalog may include pre-defined placement attributes, or the user may define such placement attributes during design time in the design studio provided by UI 106.

In some examples, the user may define additional NF-specific placement attributes or labels. As an example, a user may specify that, for a first NSST, a first NF is to be placed at an Edge in an EMEA region. To define this criteria of the first NSST, the user may add, via UI 106, a first label "Cloud-Domain: Edge" and a second label "Location: EMEA" to the network function in the first NSST.

In some examples, UI 106 may automatically determine which NF or sub-NSST may co-habit a same cloud or share the same placement criteria such that the user is not required to specify such criteria. Therefore, the user may design, via UI 106, a logical NSST with one or more NFs and/or one or more sub-NSSTs, each of which may (or may not) share the same placement attributes. At instantiation time, a Service Management & Orchestration (SMO) of provisioning system 102 determines a placement of individual NFs based on NF-specific user-defined labels, cloud topology, available resources, hardware requirements, SLA requirements, etc. In some examples, the SMO uses such criteria to determine a best or optimal placement of the individual NFs of the NSST.

FIG. 11A is a conceptual view of a user interface screen for adding a slice template for use in provisioning a network service, according to techniques of the disclosure. The example of FIG. 11A depicts an example of a slice template for a Video Streaming slice. In some examples, the user interface may enable a user to add components from multiple lists of components, including a "general" list and a "services" list. As depicted in the example of FIG. 11A, by hovering a cursor over the "UPF" element, UI 106 may present window depicting attributes of the element, such as a list of interfaces associated with the "UPF" element.

FIG. 11B is a conceptual view of a user interface screen for adding a slice template for use in provisioning a network service, according to techniques of the disclosure. The example of FIG. 11B depicts an example for adding a network function to a slice template. As depicted in FIG. 11B, a user may add a network function to the slice template of FIG. 11A. The user interface of FIG. 11B may enable a user to define one or more interfaces, properties, or labels for the network function. In the example of FIG. 11B, the user interface enables a user to define one or more interfaces, a name of each interface, an network link of each interface.

FIG. 11C is a conceptual view of a user interface screen for adding a slice template for use in provisioning a network service, according to techniques of the disclosure. The example of FIG. 11C depicts an example for adding a network function to a slice template. As depicted in FIG. 11C, a user may add a network function to the slice template of FIG. 11A. The user interface of FIG. 11C may enable a user to define one or more interfaces, properties, or labels for the network function. In the example of FIG. 11C, the user interface enables a user to define one or more labels, a value of each label, a key of each label, a description of each label, an identify of a user creating each label, and a total number of objects associated with each label.

In some examples, the techniques of the disclosure enable a user interface for adding a network function to a slice template. The user interface may enable a user to define one or more interfaces, properties, or labels for the network function. In some examples, the user interface provides a "filter" element that allows a user to define one or more rules for the labels. In some examples, the user interface enables a user to define one or more interfaces, properties, or labels using one or more Boolean operators. In some examples, UI 106 enables a user to define a "Cloud" field to have a value of "edge" and a "location" field to have a value of "EMEA". The use of the Boolean operator "AND" requires both the "cloud" and "location" fields to be satisfied.

In some examples, UI 106 enables the implementation of pre-configured templates. For example, a slice or service administrator may design, via UI 106, services from scratch by importing network functions and/or network slice subnet templates. Additionally, a user may import, via UI 106, existing templates that are standard Cloud Service Archive (CSAR)-based packages and store them in inventory of DB 108.

In some examples, the design studio provided by UI 106 may provide a set of basic pre-designed and configured templates to assist users with template design. In some examples, the pre-designed templates may include a Basic eMBB CN (Core Network) NSST, a Basic eMBB RAN (Radio Access Network) NSST, or a Basic 5G NST, etc. The use of such pre-designed templates may allow users to start from a basic topology and configuration rather than starting from scratch. In some examples, UI 106 enables a user to customize a pre-designed template by adding, removing, or updating network functions, network links, or other configuration, etc., to achieve a desired topology or design.

In some examples, the design studio provided by UI 106 may enable a user to perform real-time template validation of the slice and slice subnet templates. For example, the design studio provided by UI 106 may provide real-time feedback on correctness and feasibility of a template. Therefore, UI 106 may assist a user in identifying misconfiguration and suggest remedies during design time.

In some examples, UI 106 may perform the following steps during design time validation. UI 106 translates a template defined by a user into Topology and Orchestration Specification for Cloud Applications (TOSCA) format. UI 106 sends the template to a validator service. In some examples, UI 106 sends the template to the validator service at regular intervals or when a new component is added or configured. Upon receiving the template, the validator service performs checks and updates the designer view provided by UI 106 with the result. If the validator service identifies an error, UI 106 displays one or more warning icons on each added element with a detected error. Additionally, UI 106 may depict a reason or explanation for each warning.

In some examples, the design studio provided by UI 106 may provide enhanced service qualification and feasibility. For example, UI 106 may enable a slice administrator to perform a service pre-order qualification check to validate technical eligibility and feasibility of a designed template to be deployed on provided infrastructure. As a part of the design workflow, a user may provide GSMA GST/NEST attributes, such as uplink/downlink throughput, area of service, max number of UEs/PDUs, etc. Once the user has designed a template and configured the template with GST attributes, a slice administrator may select, via UI 106, a Validate function wherein a feasibility request for the template is sent to an orchestrator. In response to receiving the feasibility request, the orchestrator creates a deployment plan (homing and placement) and performs eligibility checks with the infrastructure to follow the SLA requirements. The orchestrator sends the results of the feasibility test to UI 106 for display to the user. This workflow provided by the system described herein enables a slice administrator to validate a feasibility of a designed template without real deployment of the slice.

In some examples, UI 106 may depict one or more elements of the network slice, sub-slice, or service designer in one or more colors. In some examples, UI 106 may select one or more colors based on a severity, or may indicate more or less components, networks, network functions, and labels than depicted in the foregoing examples. In some examples, UI 106 may present a visualization using one or more interactive or non-interactive diagrams that depict one or more aspects of network slicing, clouds, or cell towers. In some examples, UI 106 may present dynamic visualizations representing a number of network functions and provide an interface enabling a user to drag-and-drop individual network functions. In some examples, UI 106 may include one or more customizable containers that enable a user to visualize labels or other function details. As described above, UI 106 may provide one or more basic, pre-designed and configured templates to assist a user with template design.

In some examples, UI 106 may provide real-time feedback on a correctness and feasibility of a designed template. Therefore, a slice administrator may perform, via UI 106, a service pre-order qualification check to validate a technical eligibility and feasibility of a designed template to be deployed on provided infrastructure without deploying the template.

In some examples, UI 106 uses Scalable Vector Graphics (SVG) technology and graph layout libraries to allow a user to create configurable and dynamic layouts. The visualization of UI technologies and graph layout libraries as provided by a user interface as described herein was not previously available using other methods. Furthermore, a user interface as described herein may allow a user to customize label details and network details of a template for a network slice, sub-slice, or service.

In accordance with the techniques of the disclosure, UI 106 of provisional portal 104 may provide a user interface enabling a user of client device 101 to perform basic end-to-end network slicing with multi-cloud and multi-domain support (RAN, Transport Network, Core, SGi). The techniques set forth herein may enable UI 106 to provide a Service Designer interface with which a user may design a complete service and network slice and save the designed service and network slice in the database.

Additionally, the techniques set forth herein may enable UI 106 to provide a Slice Designer interface. The Slice Designer interface may use cloud topology information when instantiating network slices to place network slice subnets onto appropriate clouds based on affinity labels (of the clouds vs NSSTs) and the cloud topology information.

In one example, a user, such as an administrator of a network service provider, may, via UI 106, import CNFDs or PNFDs in an NF Catalog, where each NF can have its own placement requirements. For example, each NF may include an "App Descriptor" for use in Label-based CNF placement in a multi-cloud environment. In some examples, the user may define additional NF-specific placement attributes or labels.

In some examples, the user may, via UI 106, design logical NSSTs (e.g. RAN, Core) by grouping domain-specific NFs and/or sub-NSSTs together and connecting them with data plane and control plane logical links. For example, the user may, via UI 106, design a logical RAN NSST composed of RU, DU, CU sub-NSST (CU-UP, CU-CP) and Near-RT RIC with their connectivity requirements).

In some examples, the user may, via UI 106, define additional NF-specific placement attributes or labels. For example, the user may define an attribute for an NSST that requires an NF for the NSST to be placed at an edge. In some examples, UI 106 may automatically determine whether the NF and sub-NSST may cohabit the same cloud and share the same placement criteria, such that the user is not required to make such a determination. UI 106 may thereby enable the user to design a logical NSST with one or more NFs or sub-NSSTs which may or may not share the same placement attributes. Then, at instantiation time, the SMO may determine a best or optimal placement of individual NFs depending on NF-specific user-defined labels, cloud topology, available resources, hardware requirements, SLA requirements, etc. The designed NSSTs are stored in an SMO NSST Catalog of database 108 and made available for inclusion into other NSST or NST designs.

In some examples, the user may, via UI 106, design logical NSTs (end-to-end slices) by combining one or more NSSTs. The designed NSTs are stored in an SMO NST Catalog of database 108 and made available for inclusion into Communication Service Templates.

In some examples, the user defines one or more communication services by combining one or more NSTs with a Service Profile or SLA. The designed CSTs are stored in an SMO CST Catalog of database 108 and made available for ordering.

In some examples, label management elements of UI 106 may be changed to use severity colors, include additional functionality to show more components, or manage network lines, network functions, or labels. In some examples, label management visualization may be used in any interactive and non-interactive diagrams that relate to network slicing, clouds, or cell towers. The label management visualization described herein provides a dynamic way to assign and filter network functions. Furthermore, label-based filtering allows a user to visualize and manage network functions, interfaces, and network links. In some examples, label management uses SVG technology and graph layout libraries to allow configurable and dynamic layouts. The label management techniques described herein, in some examples, includes back-end placement algorithms. This visualization of UI technologies and graph layout libraries provides a user with a mechanism for understanding network slice and network slice subnet deployment which was not previously available.

FIG. 12 is a flowchart illustrating an operation for provisioning network services, according to techniques of the disclosure. In some examples, the operation depicted by FIG. 12 may be implemented by UI 106 of provisioning portal 104 and provisioning system 102 of network system 100 of FIG. 1.

UI 106 of provisioning portal 104 provides a user interface for adding a network slice template 111 for use in provisioning a network service. For example, UI 106 receives, from a first user such as an administrator, an indication of a first selection of one or more network functions 204 (1202). Furthermore, UI 106 receives, from the first user, an indication of a second selection of one or more labels specifying placement of the one or more network functions (1204). Provisioning system 102 may define, based on the first selection and the second selection, an NSST 113 (1206). For example, the NSST 113 may specify the selected one or more network functions and the placement of the one or more network functions such that the NSST 113 defines a preconfigured portion of a network slice. Provisioning portal 104 stores the defined NSST 113 in an SMO catalogue hosted by database 108 (1208).

UI 106 receives, from a second user such as a mobile network operator, an indication of a third selection one or more NSSTs 113 (1210). In this example, the one or more selected NSSTs 113 includes the NSST 113 defined above based on the first and second selections. Provisioning system 102 obtains the one or more NSSTs 113 from the SMO catalogue of database 108 in response to the indication of the third selection (1212). Each NSST 113 defines a portion of a network slice. Provisioning system 102 may define an NST 111 based on the one or more NSSTs 113, wherein the NST 111 defines an end-to-end network slice. Deployment unit 122 of provisioning system 102 deploys the network slice in accordance with the NST 111 (1216).

The following examples may illustrate one or more aspects of the disclosure.

Example A1. A method comprising: obtaining, by processing circuitry, one or more network slice subnet templates (NSSTs); defining, by the processing circuitry, a network slice template (NST) based on the one or more NSSTs; and deploying, by the processing circuitry, a network slice in accordance with the NST.

Example A2. The method of example A1, wherein obtaining the one or more NSSTs comprises: obtaining one or more domain-level NSSTs for a domain-specific network service; or obtaining one or more root-level NSSTs for an end-to-end network service.

Example A3. The method of any combination of examples A1 through A2, wherein obtaining the one or more NSSTs comprises obtaining, by the processing circuitry, one or more of: a Radio Access Nework (RAN) domain NSST; a 5G core domain NSST; a transport network domain NSST; a value-added service domain NSST; or an enhanced mobile broadband (EMBB) domain NSST.

Example A4. The method of any combination of examples A1 through A2, wherein obtaining the one or more NSSTs comprises: obtaining, by the processing circuitry, an NSST for each domain of a plurality of domains; and defining, by the processing circuitry, a domain NSST based on the NSST for each domain of the plurality of domains.

Example A5. The method of A4, wherein obtaining the NSST for each domain of the plurality of domains comprises: obtaining, by the processing circuitry, an Open Radio Access Network (O-RAN) cell NSST; obtaining, by the processing circuitry, an O-RAN edge NSST, and wherein defining the domain NSST comprises defining an O-RAN full NSST based on the O-RAN cell NSST and the O-RAN edge NSST.

Example A6. The method of A4, wherein obtaining the NSST for each domain of the plurality of domains comprises: obtaining, by the processing circuitry, a 5G core data-plane NSST; obtaining, by the processing circuitry, a 5G core management-plane NSST; and wherein defining the domain NSST comprises defining a 5G core complete NSST based on the 5G core data-plane NSST and the 5G core management-plane NSST.

Example A7. The method of any combination of examples A1 through A6, wherein obtaining the one or more NSSTs comprises: presenting, by the processing circuitry and to a user via a user interface, one or more pre-configured NSSTs; receiving, by the processing circuitry and from the user via the user interface, an input; and modifying the one or more pre-configured NSSTs with the input to obtain the one or more NSSTs.

Example A8. The method of example A7, wherein the one or more pre-configured NSSTs comprise at least one of: a basic enhanced mobile broadband (eMBB) Core Network (CN) NSST; a basic enhanced mobile broadband (eMBB) Radio Access Network (RAN) NSST; ora basic 5G NST.

Example A9. The method of any combination of examples A1 through A8, wherein defining the NST comprises receiving, from a user via a user interface, an indication of a selection of one or more labels specifying one or more criteria, and wherein deploying the network slice comprises selecting, for inclusion within the deployed network slice, one or more network functions of a plurality of network functions identified by the one or more NSTs, the selected one or more network functions fulfilling the one or more criteria specified by the one or more labels.

Example A10. The method of example A9, wherein the one or more criteria of the one or more labels comprise one or more of: a cloud for deployment of the network slice; or a region for deployment of the network slice.

Example A11. The method of any combination of examples A1 through A10, further comprising validating, by the processing circuitry, the NST.

Example A12. The method of example A11, wherein validating the NST comprises: converting, by the processing circuitry, the NST into a Topology and Orchestration Specification for Cloud Applications (TOSCA) format; transmitting, by the processing circuitry, the converted NST to a validator service; receiving, by the processing circuitry, one or more warnings for the NST from the validator service; and displaying, by the processing circuitry, the one or more warnings to a user via a user interface.

Example A13. The method of any combination of examples A1 through A12, wherein importing one or more NFDs comprises at least one of: importing one or more virtualized network functions (VNFs); importing one or more cloud-native network functions (CNFs); or importing one or more physical network functions (PNFs).

Example A14. The method of any combination of examples A1 through A13, further comprising: presenting, by the processing circuitry, a user interface, the user interface depicting a representation of one or more network links, one or more network functions, one or more networks, the one or more NSSTs, and the NST; receiving, by the processing circuitry and from a user via the user interface, a first input configuring the one or more network links to interconnect the one or more network functions, receiving, by the processing circuitry and from the user via the user interface, a second input adding the one or more network functions to the one or more networks; wherein obtaining the one or more NSSTs comprises receiving, from the user via the user interface, a third input adding the one or more networks to the one or more NSSTs, and wherein defining the NST comprises receiving, from the user via the user interface, a fourth input adding the one or more NSSTs to the NST.

Example B1. A method comprising: receiving, by processing circuitry and from a user, a first selection of one or more network functions; receiving, by the processing circuitry and from the user, a second selection of one or more labels specifying placement of the one or more network functions; defining, by the processing circuitry and based on the first selection and the second selection, a network slice subnet template; and storing, by the processing circuitry and in a Service Management & Orchestration (SMO) catalogue of network slice subnet templates hosted by a database, the defined network slice subnet template.

Example B2. The method of example B1, further comprising: receiving, by the processing circuitry and from the user, a third selection of one or more network slice subnet templates of the SMO catalogue of network slice subnet templates; and defining, by the processing circuitry and based on the third selection, a network slice template; and storing, by the processing circuitry and in an SMO catalogue of network slice templates hosted by the database, the defined network slice template.

Example B3. The method of example B2, further comprising: receiving, by the processing circuitry and from the user, a fourth selection of one or more network slice templates of the SMO catalogue of network slice templates; and defining, by the processing circuitry and based on the fourth selection, a communication service template; and storing, by the processing circuitry and in an SMO catalogue of communication service templates hosted by the database, the defined communication service template.

Example B4. The method of example B3, further comprising: receiving, by the processing circuitry and from the user, a fifth selection of one or more communication service templates of the SMO catalogue of communication service template; and deploying, by the processing circuitry, one or more communication services in accordance with the selected one or more communication service templates.

Example B5. The method of any of examples B1 through B4, further comprising: deploying one or more communication services in accordance with the defined network slice subnet template.

Example B6. A system comprising processing circuitry configured to: receive, from a user, a first selection of one or more network functions; receive, from the user, a second selection of one or more labels specifying placement of the one or more network functions; define, based on the first selection and the second selection, a network slice subnet template; and store, in a Service Management & Orchestration (SMO) catalogue of network slice subnet templates hosted by a database, the defined network slice subnet template.

Example B7. The system of B6, configured to perform the method of any of examples B1 through B5.

The techniques described in this disclosure may be implemented, at least in part, in hardware, software, firmware or any combination thereof. For example, various aspects of the described techniques may be implemented within one or more programmable processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

What is claimed is:

1. A method comprising:
    obtaining, by processing circuitry, one or more network slice subnet templates (NSSTs), wherein obtaining the one or more NSSTs comprises:
        obtaining an NSST for each domain of a plurality of domains, wherein obtaining the NSST for each domain of the plurality of domains comprises:
            obtaining a 5G core data-plane NSST;
            obtaining a 5G core management-plane NSST; and
        defining a domain NSST based on the NSST for each domain of the plurality of domains, wherein defining the domain NSST comprises defining a 5G core complete NSST based on the 5G core data-plane NSST and the 5G core management-plane NSST;
    defining, by the processing circuitry, a network slice template (NST) based on the one or more NSSTs; and
    deploying, by the processing circuitry, a network slice in accordance with the NST.

2. The method of claim 1, wherein obtaining the one or more NSSTs comprises:
    obtaining one or more domain-level NSSTs for a domain-specific network service; or
    obtaining one or more root-level NSSTs for an end-to-end network service.

3. The method of claim 1,
    wherein obtaining the NSST for each domain of the plurality of domains comprises obtaining the NSST for each domain of a plurality of first domains, and
    wherein obtaining the one or more NSSTs further comprises:

obtaining an NSST for each domain of a plurality of second domains, wherein obtaining the NSST for each domain of the plurality of second domains comprises:

obtaining an Open Radio Access Network (O-RAN) cell NSST; and obtaining an O-RAN edge NSST; and defining a domain NSST based on the NSST for each domain of the second plurality of domains, wherein defining the domain NSST for each domain of the second plurality of domains comprises defining an O-RAN full NSST based on the O-RAN cell NSST and the O-RAN edge NSST.

4. The method of claim 1, wherein obtaining the one or more NSSTs comprises:

presenting, by the processing circuitry and to a user via a user interface, one or more pre-configured NSSTs;

receiving, by the processing circuitry and from the user via the user interface, an input; and modifying, by the processing circuitry, the one or more pre-configured NSSTs with the input to obtain the one or more NSSTs.

5. The method of claim 4, wherein the one or more pre-configured NSSTs comprise at least one of:

a basic enhanced mobile broadband (eMBB) Core Network (CN) NSST;

a basic enhanced mobile broadband (eMBB) Radio Access Network (RAN) NSST; or a basic 5G NST.

6. The method of claim 1, wherein defining the NST comprises receiving, from a user via a user interface, an indication of a selection of one or more labels specifying one or more criteria, and wherein deploying the network slice comprises selecting, for inclusion within the deployed network slice, one or more network functions of a plurality of network functions identified by the one or more NSSTs, the selected one or more network functions fulfilling the one or more criteria specified by the one or more labels.

7. The method of claim 1, wherein obtaining the one or more NSSTs comprises:

importing one or more network function descriptors (NFDs), the one or more NFDs comprising at least one of:

one or more virtualized network functions (VNFs);

one or more cloud-native network functions (CNFs); or one or more physical network functions (PNFs); and defining, based on the one or more NFDs, the one or more NSSTs.

8. The method of claim 1, further comprising:

presenting, by the processing circuitry, a user interface, the user interface depicting a representation of one or more network links, one or more network functions, one or more networks, the one or more NSSTs, and the NST;

receiving, by the processing circuitry and from a user via the user interface, a first input configuring the one or more network links to interconnect the one or more network functions; and receiving, by the processing circuitry and from the user via the user interface, a second input adding the one or more network functions to the one or more networks, wherein obtaining the one or more NSSTs comprises receiving, from the user via the user interface, a third input adding the one or more networks to the one or more NSSTs, and wherein defining the NST comprises receiving, from the user via the user interface, a fourth input adding the one or more NSSTs to the NST.

9. A computing system comprising processing circuitry having access to a memory, the processing circuitry configured to:

obtain one or more network slice subnet templates (NSSTs)), wherein to obtain the one or more NSSTs, the processing circuitry is configured to:

obtain an NSST for each domain of a plurality of domains, wherein to obtain the NSST for each domain of the plurality of domains, the processing circuitry is configured to:

obtain a 5G core data-plane NSST;

obtain a 5G core management-plane NSST; and define a domain NSST based on the NSST for each domain of the plurality of domains, wherein to define the domain NSST, the processing circuitry is configured to define a 5G core complete NSST based on the 5G core data-plane NSST and the 5G core management-plane NSST;

define a network slice template (NST) based on the one or more NSSTs; and deploy a network slice in accordance with the NST.

10. The system of claim 9, wherein to obtain the one or more NSSTs, the processing circuitry is configured to:

obtain one or more domain-level NSSTs for a domain-specific network service; or obtain one or more root-level NSSTs for an end-to-end network service.

11. The system of claim 9, wherein to obtain the NSST for each domain of the plurality of domains, the processing circuitry is configured to obtain the NSST for each domain of a plurality of first domains, and wherein to obtain the one or more NSSTs, the processing circuitry is configured to:

obtain an NSST for each domain of a plurality of second domains, wherein to obtain the NSST for each domain of the plurality of second domains, the processing circuitry is configured to:

obtain an Open Radio Access Network (O-RAN) cell NSST;

obtain an O-RAN edge NSST, and define a domain NSST based on the NSST for each domain of the second plurality of domains, wherein to define the domain NSST for each domain of the second plurality of domains, the processing circuitry is configured to define an O-RAN full NSST based on the O-RAN cell NSST and the O-RAN edge NSST.

12. The system of claim 9, wherein to obtain the one or more NSSTs, the processing circuitry is configured to:

present, to a user via a user interface, one or more pre-configured NSSTs;

receive, from the user via the user interface, an input; and modify the one or more pre-configured NSSTs with the input to obtain the one or more NSSTs.

13. The system of claim 12, wherein the one or more pre-configured NSSTs comprise at least one of:

a basic enhanced mobile broadband (eMBB) Core Network (CN) NSST;

a basic enhanced mobile broadband (eMBB) Radio Access Network (RAN) NSST; or a basic 5G NST.

14. The system of claim 9, wherein to define the NST, the processing circuitry is configured to receive, from a user via a user interface, an indication of a selection of one or more labels specifying one or more criteria, and wherein to deploy the network slice, the processing circuitry is configured to select, for inclusion within the deployed network slice, one or more network functions of a plurality of network functions identified by the one or more NSSTs, the selected one or more network functions fulfilling the one or more criteria specified by the one or more labels.

15. The system of claim 9, wherein to obtain the one or more NSSTs, the processing circuitry is configured to:

import one or more network function descriptors (NFDs), the one or more NFDs comprising at least one of:

one or more virtualized network functions (VNFs);

one or more cloud-native network functions (CNFs); or one or more physical network functions (PNFs); and define, based on the one or more NFDs, the one or more NSSTs.

16. A method comprising:

receiving, by processing circuitry, an indication of a first selection of one or more network functions;

receiving, by the processing circuitry, an indication of a second selection of one or more labels specifying placement of the one or more network functions;

defining, by the processing circuitry and based on the first selection and the second selection, a network slice subnet template (NSST);

storing, by the processing circuitry and to a Service Management & Orchestration (SMO) catalogue of NSSTs hosted by a database, the defined NSST;

receiving, by the processing circuitry, an indication of a third selection of one or more NSSTs, the one or more NSSTs including the defined NSST;

in response to the indication of the third selection, obtaining, by the processing circuitry and from the SMO catalogue, the one or more NSSTs;

defining, by the processing circuitry, a network slice template (NST) based on the one or more NSSTs; and deploying, by the processing circuitry, a network slice in accordance with the NST.

* * * * *